(12) United States Patent
Dittrich et al.

(10) Patent No.: US 11,905,752 B2
(45) Date of Patent: Feb. 20, 2024

(54) SYSTEMS AND METHODS FOR ASSEMBLING SUB-COMPONENTS, SUB-ELEMENTS, AND BUILDING ELEMENTS

(71) Applicant: House of Design LLC, Nampa, ID (US)

(72) Inventors: Shane Christopher Dittrich, Nampa, ID (US); Robert David Dudley Carlson, Nampa, ID (US); Jason T. Giuffre, Nampa, ID (US); Anthony P. D'Andrea, Caldwell, ID (US); Anthony W. Foster, Middleton, ID (US); Richard D. Murdock, Meridian, ID (US); Timothy G. Mathson, Nampa, ID (US); Curtis R. Fletcher, Boise, ID (US)

(73) Assignee: House of Design LLC, Nampa, ID (US)

( * ) Notice: Subject to any disclaimer, the term of this patent is extended or adjusted under 35 U.S.C. 154(b) by 44 days.

(21) Appl. No.: 17/373,349

(22) Filed: Jul. 12, 2021

(65) Prior Publication Data
US 2022/0010608 A1   Jan. 13, 2022

Related U.S. Application Data

(60) Provisional application No. 63/050,948, filed on Jul. 13, 2020.

(51) Int. Cl.
*E06B 1/02* (2006.01)
*E04B 2/70* (2006.01)

(52) U.S. Cl.
CPC . *E06B 1/02* (2013.01); *E04B 2/70* (2013.01)

(58) Field of Classification Search
CPC ..... E06B 1/02; E04B 2/70; E04B 1/35; E04B 2/56; E04B 2/58; E04B 2/76; E04B 2/789; Y10T 29/53; Y10T 29/53048; Y10T 29/49616; Y10T 29/49623; Y10T 29/49627; Y10T 29/49629; E04G 21/16; E04C 2/384; E04C 2003/0473
USPC .... 29/897, 897.3, 897.312, 897.32, 700, 711
See application file for complete search history.

(56) References Cited

U.S. PATENT DOCUMENTS

| | | |
|---|---|---|
| 7,172,064 B2 | 2/2007 | Alversson |
| 8,359,737 B2 | 1/2013 | Englundh |
| 8,984,732 B2 | 3/2015 | Svensson |
| 9,353,519 B2 * | 5/2016 | Williams ................ B27F 7/006 |

(Continued)

FOREIGN PATENT DOCUMENTS

| | | |
|---|---|---|
| WO | 2019027311 | 2/2019 |
| WO | 2019237030 | 12/2019 |

OTHER PUBLICATIONS

International Search Report and Written Opinion dated Oct. 13, 2021 for international application PCT/US2021/041303.

*Primary Examiner* — Sarang Afzali
*Assistant Examiner* — Darrell C Ford
(74) *Attorney, Agent, or Firm* — Foley & Lardner LLP

(57) ABSTRACT

Systems and methods for automated extrusion of main elements for building construction are disclosed wherein sub-components of sub-elements are extruded by automated means, and sub-elements are assembled by automated means, and the sub-elements are incorporated into main elements by automated means.

20 Claims, 11 Drawing Sheets

(56) References Cited

U.S. PATENT DOCUMENTS

| | | | |
|---|---|---|---|
| 2004/0002787 A1* | 1/2004 | Koskovich | B44B 3/009 |
| | | | 700/114 |
| 2004/0089695 A1 | 5/2004 | Svensson | |
| 2009/0199929 A1 | 8/2009 | Svensson et al. | |
| 2010/0057242 A1* | 3/2010 | Williams | B27F 7/006 |
| | | | 700/114 |
| 2010/0061829 A1* | 3/2010 | McAdoo | E04C 3/17 |
| | | | 901/14 |
| 2013/0283618 A1 | 10/2013 | Williams | |
| 2014/0156049 A1* | 6/2014 | Walker, Jr. | G05B 19/4097 |
| | | | 703/1 |
| 2020/0052438 A1* | 2/2020 | Sobel | H01R 13/6271 |
| 2020/0256051 A1* | 8/2020 | Becerril Hernández | E04B 1/18 |

* cited by examiner

SYSTEMS AND METHODS FOR ASSEMBLING SUB-COMPONENTS, SUB-ELEMENTS, AND BUILDING ELEMENTS

RELATED APPLICATIONS

This application claims the benefit of priority under 35 U.S.C. § 119(e) of U.S. Provisional Patent Application No. 63/050,948, entitled SYSTEMS AND METHODS FOR ASSEMBLING SUB-COMPONENTS, SUB-ELEMENTS, AND BUILDING ELEMENTS, filed Jul. 13, 2020, which is hereby incorporated herein by reference in its entirety.

TECHNICAL FIELD

The present disclosure relates generally to the field of building construction. More particularly, systems and methods for assembling building elements, including sub-elements, are disclosed.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with reference to the accompanying drawings.

DETAILED DESCRIPTION

Figure 1:
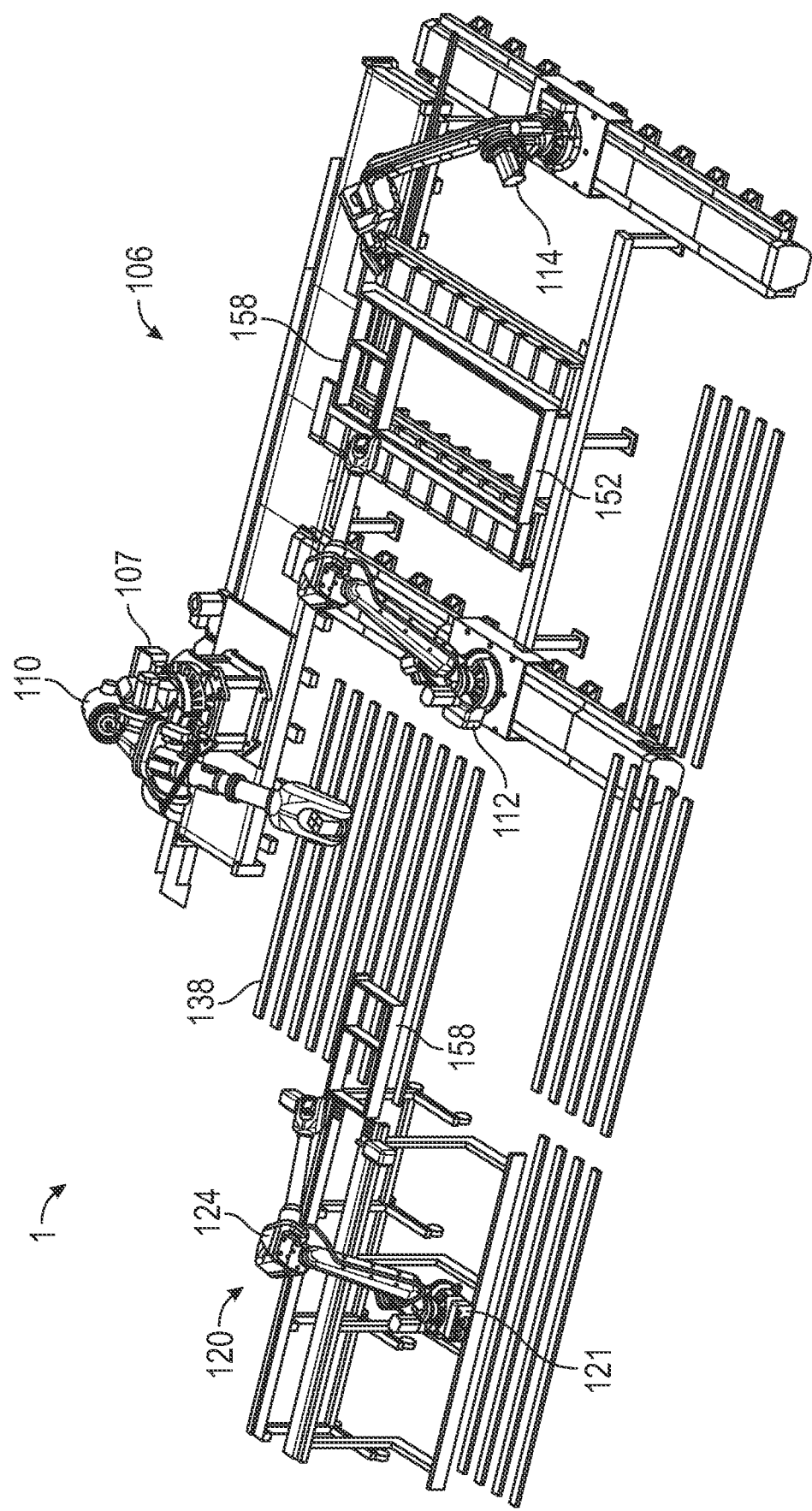
FIG. 1 is a perspective view of a portion of a wall extrusion system, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Structural elements, such as wall frames, partition frames, trusses, etc., are often assembled or pre-fabricated at a factory. Factory assembly (e.g., pre-fabrication at a factory) provides a number of advantages, including consistency of product and speed of production. Conversely, factory assembly of wall frame elements is impaired by a need to manually assemble sub-components (e.g., a sill) of sub-elements. More particularly, a wall extruder, in addition to placing and assembling primary boards (sole plate, top plates, studs), must also place sub-elements in order to form necessary structural apertures, such as door rough openings, window rough openings, mechanical/electrical/plumbing (MEP) rough openings, etc. Present technology is incapable of automatically extruding a wall frame element without manual intervention to build at least a portion of each sub-element. Present technology is incapable of automatically assembling and including an assembled sub-component in an automatically assembled sub-element of an automatically assembled element. For example, a door rough opening requires a sub-component whereby the door rough opening is disposed within the main element, and the sub-component, with the current state of the technology, must be manually constructed. The present disclosure provides for automated construction of sub-components, automated assembly of sub-components to sub-elements, and automated incorporation of sub-elements into main elements, such as for wall frame extrusion. Furthermore, the present invention permits automated programmatic configuration of a number of members, such as, e.g., headers, columns, etc., for specific applications within a main element and/or sub-element based on span, load, and governing code requirements.

The phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, etc.).

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite an element having, e.g., "a line of stitches," the disclosure also contemplates that the element can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Not every embodiment is shown in the accompanying illustrations, however, at least a preferred embodiment is shown. At least some of the features described for a shown preferred embodiment are present in other embodiments.

The present disclosure uses terms which may generally be indicative of wood frame construction, such as, e.g., dimensional lumber, board, etc. Such nomenclature is for ease of disclosure and is not intended to limit the disclosure exclusively to wood frame construction. By way of example without limitation, steel frame components, as appropriate, may be used where the disclosure references a wood product. Examples within the disclosure with measurements, e.g., 2×4, 2×6, etc., are, again, offered for ease of explaining the invention and not as limitations. Furthermore, such measurements themselves are intended to convey only an industry standard. A person of ordinary skill in the art will understand that 2×4 refers to a board of some length measuring two inches by four inches in rough, and subsequently reduced to 1½ inches by 3½ inches. Thus, references to 2× (two-by) dimensional lumber is intended to convey lumber of sizes ordinarily used in wood frame construction, and, by extension, components of concordant dimensions in other materials (e.g., steel).

The term stock refers to any material, such as, e.g., dimensional lumber, steel frame component, etc., which may, by means of the present invention, be incorporated into a building component, including a main element (e.g., wall element), sub-element, sub-component, etc.

Relatedly, fasteners may be those appropriate to the application, such as, e.g., 10d nails in certain wood framing applications, screws in other applications, nut-and-bolt in yet other applications, etc. References to "a fastener" throughout the disclosure is intended to be generic, as the actual number and type of fasteners used for a purpose is dependent upon a variety of factors, e.g., material being fastened, composition and form of the fastener, code requirements, etc.

FIG. 1 is a perspective view of a portion of a wall extrusion system 1 comprising a sub-element assembly station (SEAS) 106, a sub-component extrusion station (SCES) 120, and a main element extruder (not shown in FIG. 1) of a building component assembly system. The wall extrusion system 1 may serve to pre-fabricate building elements, such as a pre-fabricated wall and/or sub-elements for incorporation into a building or structure. Alternatively or in addition, the wall extrusion system 1 may serve to pre-fabricate building components generally, including main building elements, sub-elements, and sub-components, for use in or incorporation into a building or structure. An outfeed table 138 is disposed between the SCES 120 and the SEAS 106. The SCES 120 includes a computerized control unit 121 and a robotic arm 124. The SEAS 106 includes a computerized control unit 107, and a first robotic arm 110 capable of traversing generally the length of the outfeed table 138 and the SEAS 106. The SEAS 106, in the present embodiment, has a second robotic arm 112 and a third robotic arm 114. A sub-element 152 is shown at the SEAS 106. The sub-element 152 shown in FIG. 1 is, more particularly, a door rough opening. A sub-component 158 is shown being extruded from the SCES 120 onto the outfeed table 138. For ease of reference, an identical sub-component 158 is shown mated to the sub-element 152.

The robotic arms 110, 112, 114, 124 are shown for reference, and the purposes of each is explained below. Some embodiments may have fewer or more robotic arms than represented in the present embodiment.

Figure 2:
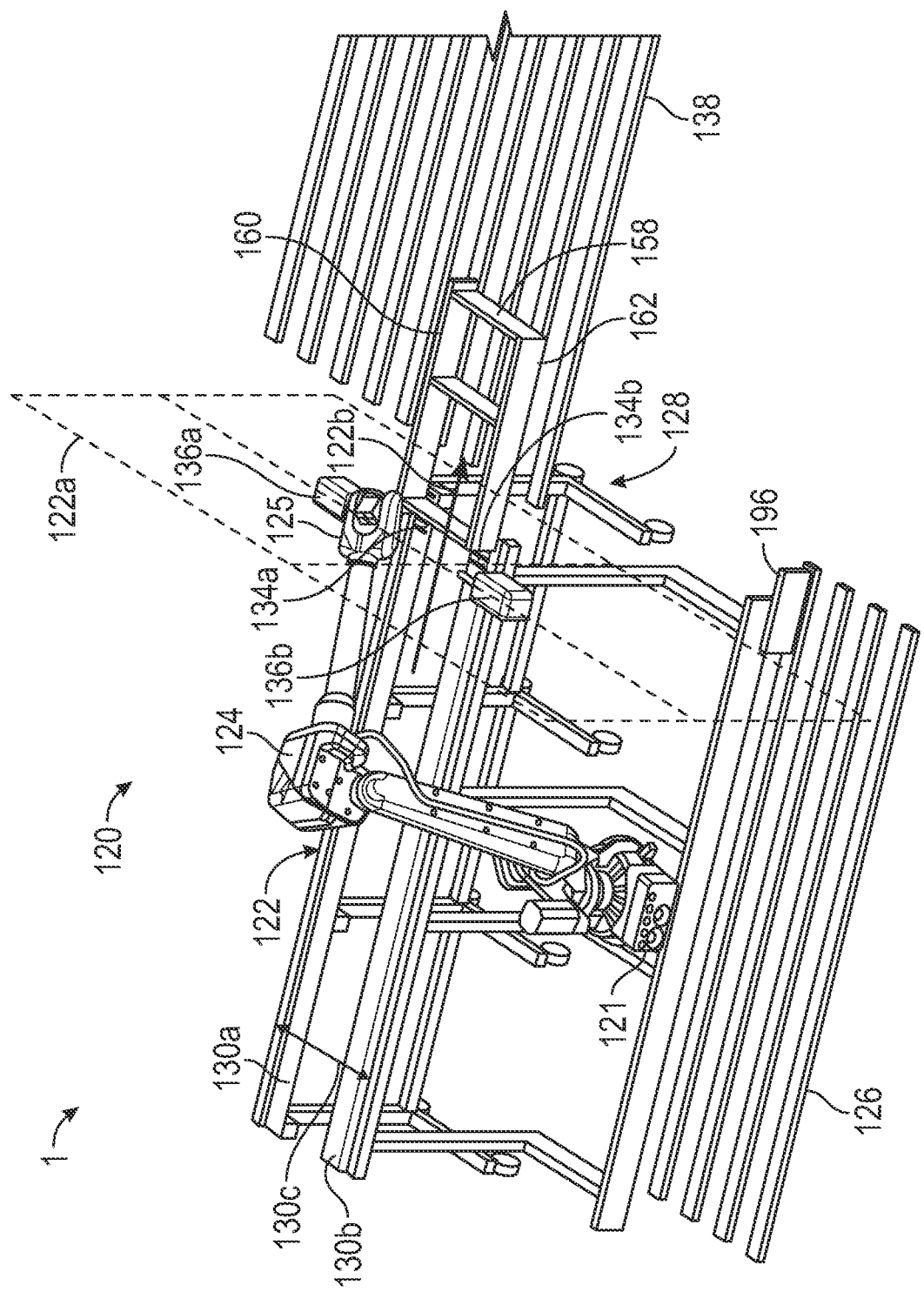
FIG. 2 is a perspective view of a sub-component extrusion station of the wall extrusion system of FIG. 1.

FIG. 2 is a perspective view of the SCES 120 of the wall extrusion system 1 of FIG. 1, extruding a sub-component 158. The SCES 120 comprises at least the computerized control unit 121, a sub-component extrusion surface 122, and the robotic arm 124. The computerized control unit 121 can be an electronic device comprising a memory and a means of executing a computer program. The computerized control unit 121 is capable of storing and executing programmatic instructions. The sub-component extrusion surface 122 has a first rail 130a and a second rail 130b. The distance 130c between the first and second rails 130a, 130b may be adjustable. For example, in one embodiment, the first rail 130a may be disposable at different positions to alter the distance 130c between the first and second rails 130a, 130b. In one embodiment, both the first rail 130a and the second rail 130b may be disposable at different positions to alter the distance 130c. In some embodiments, positioning of the first and/or second rail 130a, 130b may be controllable via the computerized control unit 121.

The sub-component extrusion surface 122 has a lateral end 128 toward the outfeed table 138. The first rail 130a, at or near the lateral end 128, comprises a first cripple stop mechanism 134a (e.g., clamp mechanism). A first fastener appliance 136a is adjacent the first rail 130a and the first cripple stop mechanism 134a. The second rail 130b, at or near the lateral end 128, comprises a second cripple stop mechanism 134b. A second fastener appliance 136b is adjacent the second rail 130b and the second cripple stop mechanism 134b (e.g., clamp mechanism). The fastener appliances 136a, 136b are disposed opposite each other. An extrusion plane 122a may be a plane orthogonal to the sub-component extrusion surface 122 and passing through the fastener appliances 136a, 136b. An extrusion direction 122b may be defined as a line (or ray) parallel to the sub-component extrusion surface 122 and orthogonal to the extrusion plane 122a, and oriented in a direction toward the lateral end 128.

The robotic arm 124 can include a manipulator 125 or end-of-arm tool that is configured to grasp or grip stock, such as 2×4, 2×6, 2×8, etc., dimensional lumber boards of predesignated lengths. An infeed 126 (e.g., infeed table) may be adjacent to the SCES 120. During operation, stock 196 to be assembled into a sub-component, are delivered via the infeed 126 to the SCES 120. Stock 196 in the form of a board is shown on the infeed 126. The robotic arm 124 uses the manipulator 125 to acquire the stock 196 from the infeed 126 and then places the stock 196 in an appropriate position and with an appropriate orientation on the sub-component extrusion surface 122.

The computerized control unit 121 may operate the robotic arm 124 and the manipulator 125 to grip and place the stock on the sub-component extrusion surface 122. The manipulator 125 may comprise an end of arm tool and have an articulable grasping component. By way of example, a sub-component may be required for a door rough opening wherein the sub-component may comprise a top plate, a bottom (or sole) plate, and a plurality of cripple studs. One or more pieces of 2×6 dimensional lumber is used for the instant example; however, the stock 196 dimensions may be any size appropriate to the given project. A first member 160, being 2×6 stock 196 precut to an appropriate length, may be delivered via the infeed 126 to the SCES 120. The robotic arm 124 may acquire the first member 160 using the manipulator 125 and place the first member 160 at an orientation and position along the first rail 130a such that the first member 160 is disposed with the 6-inch dimension orthogonal to the sub-component extrusion surface 122 and the length of the first member 160 parallel to the extrusion direction 122b. A second member 162 may be similarly delivered via the infeed 126, acquired by the manipulator 125 and disposed at a particular position along the second rail 130b and parallel to the first member 160. Additional 2×6 stock 196, each of a desired length, may sequentially arrive via the infeed 126 at the SCES 120 and may be acquired and disposed at the sub-component extrusion surface 122 between and orthogonal to the first and second members 160, 162, as further described in FIG. 3.

The placement of each member may be programmatically coordinated, such as by the computerized control unit 121. The first member 160 may be placed with a particular portion of the first member 160 adjacent the first fastener appliance 136a of the first rail 130a, the second member 162 may likewise be placed with a particular portion of the second member 162 adjacent the second fastener appliance 136b of the second rail 130b, and a first orthogonally disposed board, or first jack stud (see the first jack stud 164 in FIG. 3), may be positioned between the first member 160 and the second member 162 whereby the fastener appliances 136a, 136b are able to apply fasteners (see fasteners 198 in FIG. 3) to couple the first jack stud 164 to the first member 160 and the second member 162. Operation of the fastener appliances 136a, 136b may be controlled by the computerized control unit 121. The coupled members are then advanced, as may be directed or otherwise controlled by the computerized control unit 121, along the sub-component extrusion surface 122 a distance in the extrusion direction 122b to align a next particular portion of each of the first member 160 and the second member 162 adjacent the fastener appliances 136a, 136b. The manipulator 125 then may place an additional orthogonally disposed member (stock 196), or second jack stud (see the second jack stud 165 in FIG. 3), preparatory to the application of fasteners 198 by the fastener appliances 136a, 136b to couple the second jack stud 165 to the first member 160 and the second member 162. This process continues until each member of the sub-component 158 is assembled to the sub-component 158, and the advancement of the sub-component 158 in the extrusion direction 122b to receive additional members coupled to the sub-component 158 by the fastener appliances 136a, 136b extrudes the sub-component 158 through the extrusion plane 122a and onto the outfeed table 138.

Figure 3:
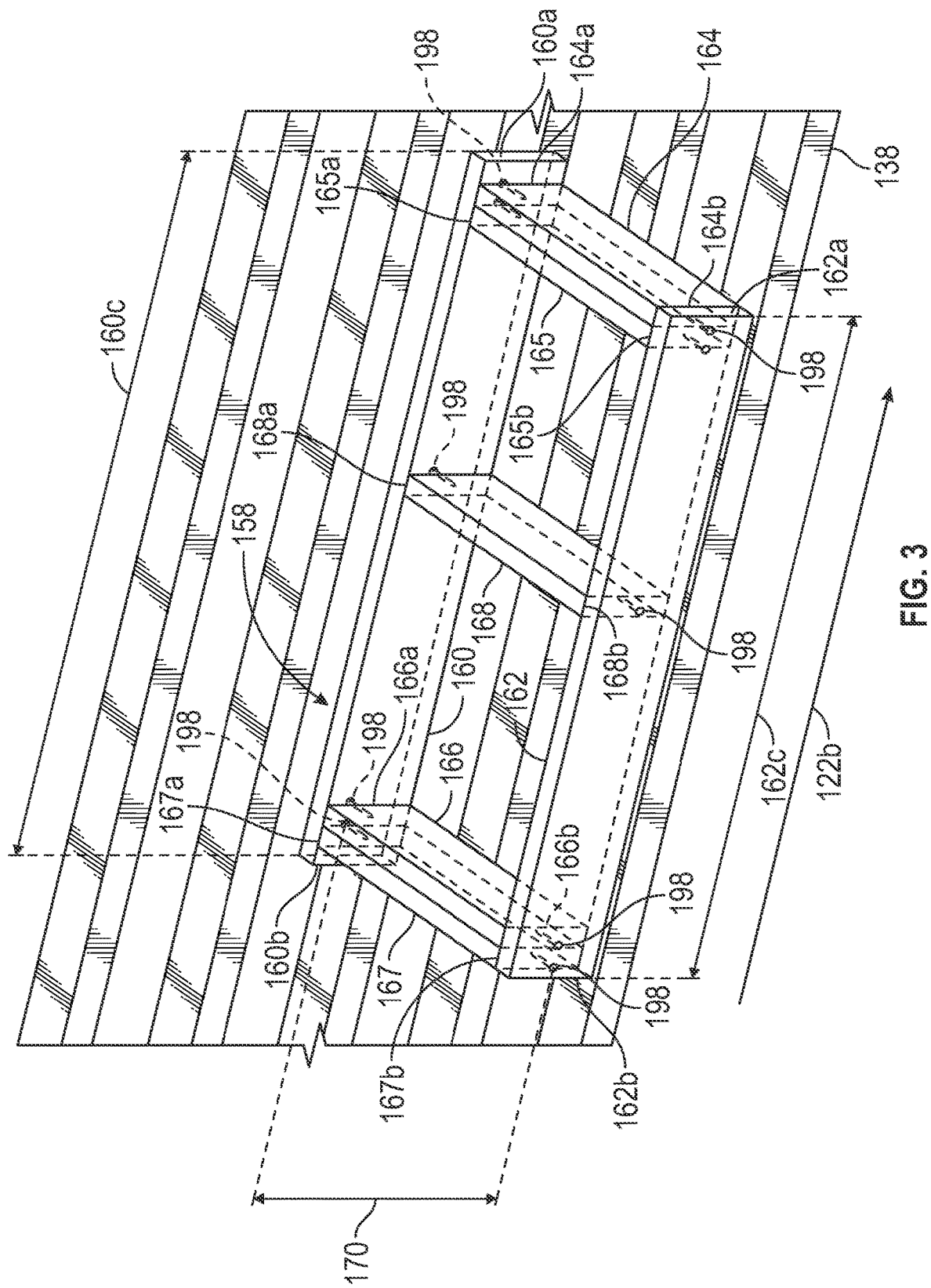
FIG. 3 is a perspective view of a sub-component, according to one embodiment of the present disclosure.

FIG. 3 is a perspective view of the sub-component 158 having been extruded from the SCES 120 onto the outfeed table 138 of the wall extrusion system 1 of FIGS. 1 and 2. The extrusion direction 122b is shown for reference. The first member 160 of the sub-component 158 has a first end 160a and a second end 160b. The second member 162 also has a first end 162a and a second end 162b. The length 160c of the first member 160 is greater than the length 162c of the second member 162. The first and second members 160, 162 are parallel. In some embodiments, the first member 160 may serve as the top plate of the sub-component 158, and the second member 162 may serve as the bottom plate. In some embodiments, the first member 160 may serve as the bottom plate of the sub-component 158, and the second member 162 may serve as the top plate. The first jack stud 164 is disposed orthogonally between the first and second members 160, 162, with a first end 164a coupled by a fastener 198 near the first end 160a of the first member 160, and with a second end 164b coupled by a fastener 198 at the first end 162a of the second member 162. As noted elsewhere in the disclosure, "a fastener" means one or more fasteners of an appropriate type for the particular application. The fasteners 198 coupling the first and second ends 164a, 164b to the respective first ends 160a, 162a of the first member 160 and the second member 162 may be applied by the fastener appliances (see the fastener appliances 136a, 136b, SCES 120 in FIG. 2) as the sub-component 158 was being extruded from the SCES 120.

Immediately adjacent to the first jack stud 164 is the second jack stud 165, also having a first end 165a and a second end 165b coupled by fasteners 198 to the first member 160 and the second member 162, respectively. The placement of the second jack stud 165 adjacent the first jack stud 164 may have been accomplished by advancing the sub-component 158 a prescribed distance, such as 1½ inches, along the sub-component extrusion surface (e.g., sub-component extrusion surface 122 in FIG. 2) in the extrusion direction 122b, and placement of the board to serve as the second jack stud 165 in the desired position by the manipulator on the robotic arm of the SCES 120 (e.g., the manipulator 125 and robotic arm 124 in FIG. 2) such that the fastener appliances 136a, 136b may apply fasteners 198 to couple the first and second ends 165a, 165b to the first and second members 160, 162 adjacent the first jack stud 164. Similarly, the sub-component 158 may have been advanced a further distance in the extrusion direction 122b, a cripple stud 168 may have been positioned at a particular position orthogonal to and between the first and second members 160, 162 such that the fastener appliances 136a, 136b may apply fasteners 198 to couple a first end 168a of the cripple stud 168 to the first member 160 and a second end 168b of the cripple stud 168 to the second member 162.

The sub-component 158 may have again been advanced in the extrusion direction 122b an appropriate distance and a third jack stud 166 may have been disposed orthogonal to and between the first and second members 160, 162. Fasteners 198 may have been applied to couple a first end 166a and a second end 166b to, respectively, the first member 160 and the second member 162. The sub-component 158 may have been advanced again, and a fourth jack stud 167 may have been disposed orthogonal to and between the first and second members 160, 162 and adjacent the third jack stud 166. Fasteners 198 may have been applied to couple a first end 167a and a second end 167b to, respectively, the first member 160 and the second member 162.

A building code or building specification (hereafter, generally, "code") may dictate placement of the cripple stud 168. In an instance having a distance below a code-defined threshold, the cripple stud 168 may be omitted. In an instance having a distance above another code-defined threshold, one or more additional cripple studs 168 may be assembled to the sub-component 158. In either situation, the sub-component 158 may be advanced along the sub-component extrusion surface 122 (an) appropriate distance(s) to permit installation of the appropriate number of cripple studs 168 in the manner described above, after the second jack stud 165 and before the third jack stud 166.

As discussed above, the length 160c of the first member 160 may be greater than the length 162c of the second member 162. In some embodiments, the first member 160 may extend laterally outward of the first jack stud 164 and the fourth jack stud 167 whereas the first end 162a of the second member 162 aligns laterally with the first jack stud 164 and the second end 162b aligns laterally with the fourth jack stud 167.

A height 170 of the sub-component 158 may be configurable for a particular application. More particularly, the height 170 may be programmatically configured by adjusting the distance between the first and second rails of the SCES 120 (see the distance 130*c*, first rail 130*a*, second rail 130*b* in FIG. 2), and by employing stock 196 of appropriate length. The first, second, third, and fourth jack studs 164-167 and cripple stud(s) 168 may, for example, be cut or otherwise configured to an appropriate length to support the height 170 of the sub-component 158 prior to arriving, via the infeed (see the infeed 126 in FIG. 2), at the SCES 120. The length 160*c* of the first member 160 may depend on the width of a sub-element for which the sub-component 158 is purposed. The length 160*c* of the first member 160 may be achieved by cutting or otherwise configuring the first member 160 before arriving, via the infeed, at the SCES 120. The length 162*c* of the second member 162 may also depend on the sub-element for which the sub-component 158 is purposed, and may similarly be achieved before arriving, via the infeed, at the SCES 120.

As discussed above, assembly of the sub-component 158 may entail programmatic placement of each of the members 160, 162, and studs 164-168 at configurable locations of the sub-component extrusion surface 122 and advancing the sub-component 158 in the extrusion direction 122*b* past the fastener appliances 136*a*, 136*b* to apply fasteners 198 whereby the members 160, 162, and studs 164-168 are coupled together to form the sub-component 158 and to dispose the sub-component 158 at the outfeed table 138.

Figure 4:
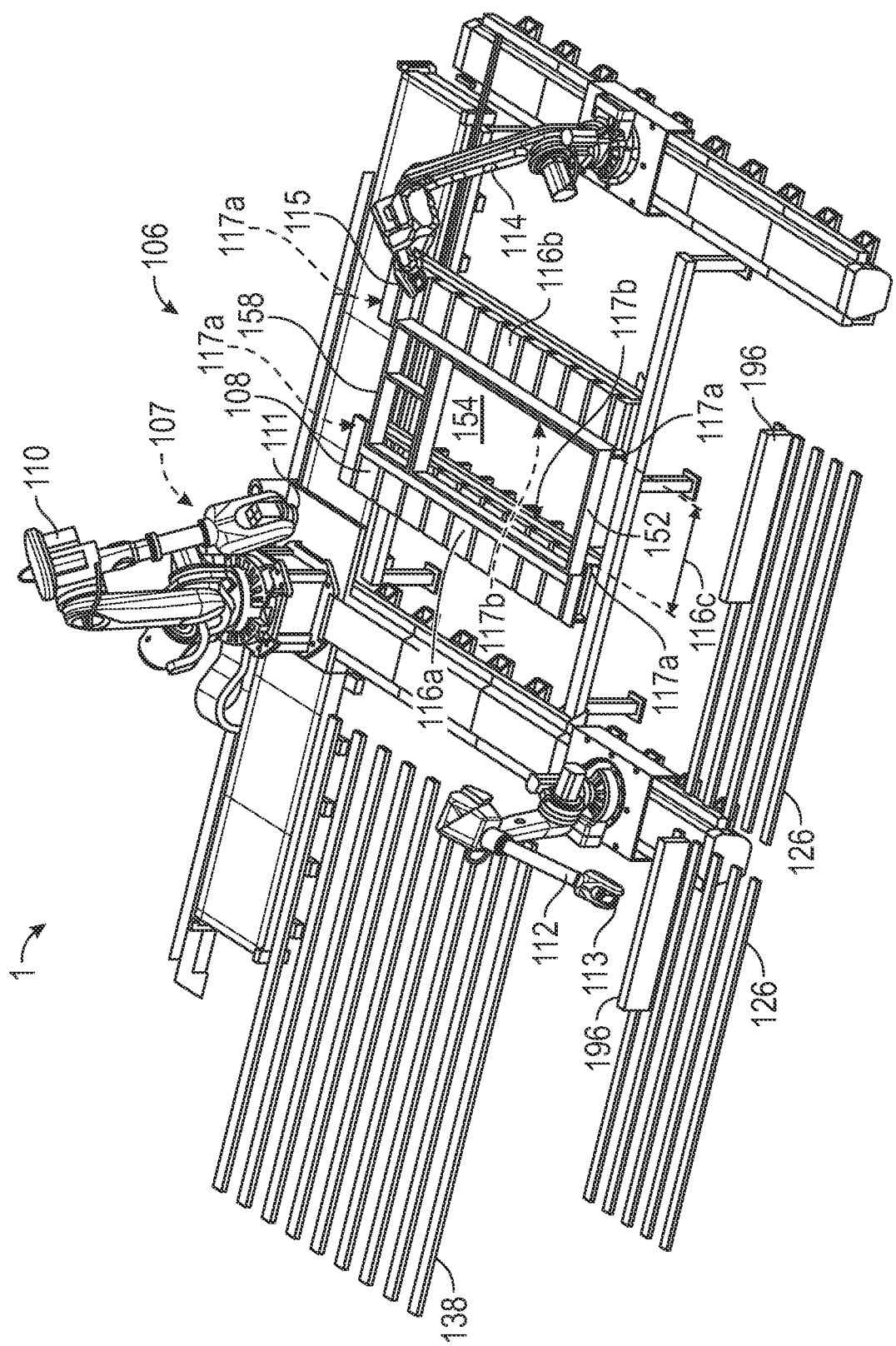
FIG. 4 is a perspective view of a sub-element assembly station of the wall extrusion system of FIG. 1.

FIG. 4 is a perspective view of the SEAS 106 of the wall extrusion system 1 of FIG. 1. In the embodiment of FIG. 4, the SEAS 106 comprises the first robotic arm 110 and two second robotic arms 112, 114. The first robotic arm 110 comprises a manipulator 111; and each of the second robotic arms 112, 114 comprises, respectively, a manipulator 113, 115. Each manipulator 111, 113, 115 may be configured with an articulable grasping component and/or a fastener appliance. The SEAS 106 comprises a first lateral rail 116*a* and second lateral rail 116*b*. The first and second lateral rails 116*a*, 116*b* are disposed with a length of each lateral rail 116*a*, 116*b* running laterally across the SEAS 106. The first and second lateral rails 116*a*, 116*b* may define an assembly surface 108. The first and second lateral rails 116*a*, 116*b* may be adjustable, whereby a distance 116*c* between the first and second lateral rails 116*a*, 116*b* may be configurable for a particular dimension of a sub-element. The first and second lateral rails 116*a*, 116*b* each have at least one stop 117*a* (e.g., clamp) disposed at or near either end of the respective lateral rails 116*a*, 116*b*, and a stop array 117*b* disposed along the lateral length of the respective lateral rail 116*a*, 116*b*. Adjacent the SEAS 106 is an infeed 126 (e.g., infeed table). The infeed 126 may be a continuation of the infeed 126 of FIG. 2, or may be distinct from the infeed 126 of FIG. 2. Operation of each of the robotic arms 110, 112, 114, the manipulators 111, 113, 115, the first and second lateral rails 116*a*, 116*b*, the stop 117*a*, and the stop arrays 117*b* may be programmatically directed by execution of a computer program at the computerized control unit 107.

Operation of the SEAS 106 may be, in many respects, similar to operation of the SCES 120. Stock 196 of particular dimensions (2×6, 2×8, etc.) and configured to a selected length may arrive at the SEAS 106 via the infeed 126. The second robotic arm 112, using the manipulator 113, or the third robotic arm 114, using the manipulator 115, may acquire the stock 196 from the infeed 126, then programmatically position the stock 196 at a desired position of the assembly surface 108 and with a desired orientation. One or more of the stops 117*a* and/or stop arrays 117*b* may engage the stock 196 to hold the stock 196 in position. Additional stock 196 may be introduced to the assembly surface 108 in similar fashion programmatically positioned at the assembly surface 108. Fasteners (see the fasteners 198 in FIGS. 3 and 5) may be applied via the manipulators 111, 113, 115 to couple together stock 196 to substantially form a sub-element 152. The sub-element 152 in FIG. 4 is for a door rough opening 154.

The sub-component 158 is shown positioned at the assembly surface 108 and adjacent a portion of the sub-element 152. The sub-component 158 may arrive at the SEAS 106 via the outfeed table 138 upon extrusion from the SCES (see the SCES 120 in FIG. 2). The first robotic arm 110 may acquire the sub-component 158 from the outfeed table 138 and programmatically position the sub-component 158 at the assembly surface 108 and adjacent the portion of the sub-element 152. The manipulators 111, 113, 115 may apply fasteners 198 to couple the sub-component 158 to the portion of the sub-element 152. The sub-element 152 is complete when all appropriate members and the sub-component are coupled together. In one embodiment, all appropriate members includes the header 172, header members 173, sole plate 174, jack studs 175-178, cripple stud(s) (see the cripple stud 168 in FIGS. 3 and 5) and subking studs 180, 182. In one embodiment, "all appropriate members" may also comprise king studs (see the king studs 184 in FIG. 5). One or more king studs 184 may be affixed to either side of the sub-element 152, as shown in FIG. 5).

The sub-element 152 is then ready to be transferred to the main element extruder (not shown). The sub-element 152 may be transferred by a suitable robot or mechanism, such as by a six- or seven-axis robot, a conveyor, or a gantry system. As used herein, the term "robot" broadly encompasses any programmatically operable mechanism configured to manipulate an object (e.g., a sub-element 152 or other structural member) in at least one of single-direction locomotion, multiple-direction locomotion, rotation about a single axis, and rotation about multiple axes. For the present disclosure, the term robot encompasses mechanisms, ranging inclusively from unidirectional conveyors to 7-axis articulating arms, capable of programmatically moving and/ or articulating an object.

In certain embodiments, during assembly of the sub-element 152, an appropriate number and arrangement of stock 196 may be assembled to the sub-element 152 to serve as a portion of a wall of any structural type, including shear walls and bearing walls. Stated differently, in certain embodiments, the sub-element 152 may be assembled to serve as a portion of one of any type of structural wall. The SEAS 106 may afford flexibility such that a sub-element 152 of any structural type can be assemble.

Figure 5:
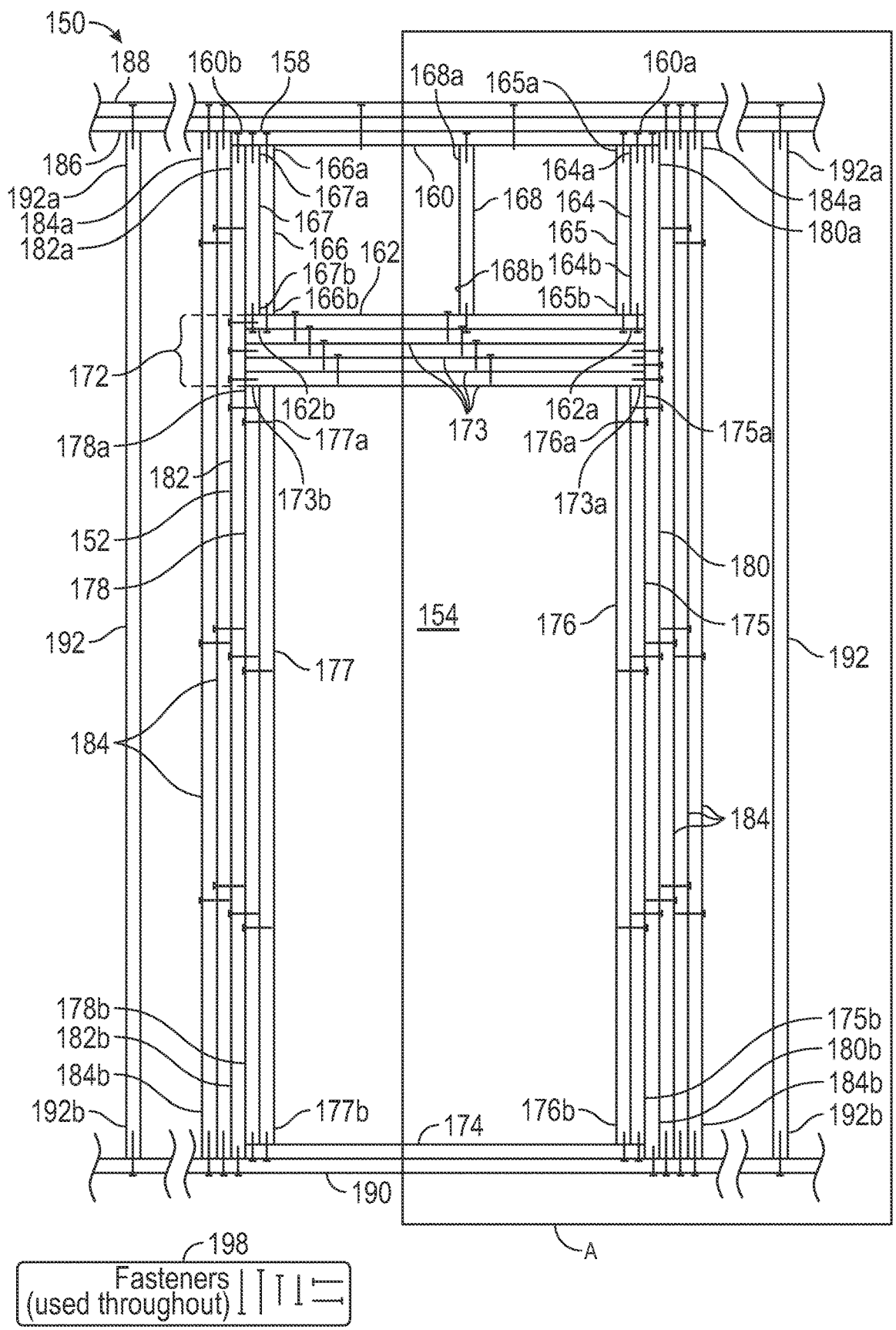
FIG. 5 is a front elevation view of a sub-element with one sub-component forming a door rough opening, according to one embodiment of the present disclosure.

FIG. 5 is a front elevation view of a portion of a building component that is a main element 150. The main element 150 may comprise the sub-element 152, and the sub-element 152 may comprise the sub-component 158, as may be produced by the wall extrusion system 1 of FIG. 1. The main element 150 comprises a first top plate 186, a second top plate 188, a plurality of studs 192, a plurality of king studs 184, a bottom (or sole) plate 190, and the sub-element 152. The sub-element 152 of FIG. 5 is particularly configured to provide a door rough opening 154 for the main element 150. Other configurations of the sub-element 152 are anticipated by the disclosure, such as to provide a window rough opening (see generally, as an example without limitation, FIG. 6), an MEP rough opening, a plural MEP configuration rough opening, etc.

A plurality of fasteners 198 is shown. The position of each fastener 198 is for reference and not by way of limitation. Similarly, the appearance of each fastener 198 is for ease of disclosure and is not intended as a limitation of the invention. Positions, dimensions, type, composition, and quantity, etc. of fasteners 198 is dependent upon a variety of factors, and the disclosure anticipates that fasteners 198 can be code-compliant for each particular application. Furthermore, in addition to coupling together members, the disclosure anticipates fasteners 198 being applied to stock (see the stock 196 in FIGS. 2 and 4) by the invention to assemble fastener-fixed lamination beams ("lam-beams"), including lam-beams used as columns.

The main element 150 may be assembled at a main element extruder of a wall extrusion system (e.g., the wall extrusion system 1 of FIG. 1). A manipulator (or end of arm tool) of a main element extruder may place stock 196 to define the first top plate 186, the second top plate 188, and the bottom plate 190 of the main element 150. A manipulator of the main element extruder may also place stock 196 orthogonal to the top plates 186, 188 and bottom plate 190 as studs 192, and as king studs 184. Furthermore, a manipulator of the main element extruder may acquire the sub-element 152 and dispose the sub-element 152 at an extrusion surface of the main element extruder. Fasteners 198 may be attached by a manipulator of the main element extruder to couple the foregoing members (top plates 186, 188, bottom plate 190, studs 192, king studs 184) and the sub-element 152.

More particularly, the main element 150 may be extruded in a direction left-to-right or right-to-left relative to FIG. 5. With the top plates 186, 188 and bottom plate 190 disposed to an extrusion surface of the main element extruder, each stud 192 and king stud 184 is placed or otherwise positioned according to a programmatic sequential order. An upper end 192*a* and a lower end 192*b* of each stud 192 may be fixed to, respectively the top plates 186, 188 and the bottom plate 190 by fasteners 198 applied by a manipulator of the main element extruder. A plurality of studs 192 may be affixed to the main element 150 in this manner and according to a governing building code for the particular application.

In one embodiment, when, in the extrusion process, a position in the main element 150 is reached where the sub-element 152 is required, a manipulator may place the sub-element 152, complete with king studs 184, at the extrusion surface. The king studs 184 may be affixed to the main element 150 with an upper end 184*a* coupled by a fastener at the top plates 186, 188 and a lower end 184*b* coupled by a fastener at the bottom plate 190. In one embodiment, when, in the extrusion process, the position in the main element 150 is reached where the sub-element 152 is required, a king stud 184 may be affixed to the top and bottom plates 186, 188, 190, the sub-element 152 is placed adjacent the king stud 184 by a manipulator, and fasteners 198 are applied to couple a subking stud 180, 182 of the sub-element 152 to the king stud 184 and the top and bottom plates 186, 188, 190. A king stud 184 is placed immediately adjacent the opposite side of the sub-element 152 and is coupled by fasteners 198 to the sub-element 152 and to the top and bottom plates 186, 188, 190. Additional king studs 184 may be added to either side of the sub-element 152. As the main element 150 is further extruded, one or more subsequent studs 192 may be affixed at code-compliant positions of the main element 150, and additional sub-elements may be added to the main element 150.

Represented in FIG. 5 is an example of the main element 150 requiring a door rough opening 154. The main element 150 comprises a first top plate 186, a second top plate 188, and a bottom plate 190, as well as a plurality of studs 192 positioned according to building code for the particular application. The door rough opening 154, in the present example, will have been assembled at the SEAS (e.g., the SEAS 106 in FIG. 2). More particularly, the door rough opening 154 will have been defined within the sub-element 152 during assembly at the SEAS 106. The sub-element 152 comprises the sub-component 158, a header 172, a bottom plate 174, jack studs 176-178, subking studs 180, 182, and, in some embodiments, king studs 184. The header 172 may be formed of a plurality of header members 173. The number of header members 173 in the header 172 complies with or exceeds code for the particular application. The header members 173 are formed as a lam-beam with appropriately affixed fasteners 198. The sub-component 158 of the sub-element 152 comprises a first member 160, a second member 162, jack studs 164-167, and one cripple stud 168 affixed according to building code for the particular application. In an application requiring more than one cripple stud 168, each cripple stud 168 is affixed according to code.

Figure 7:
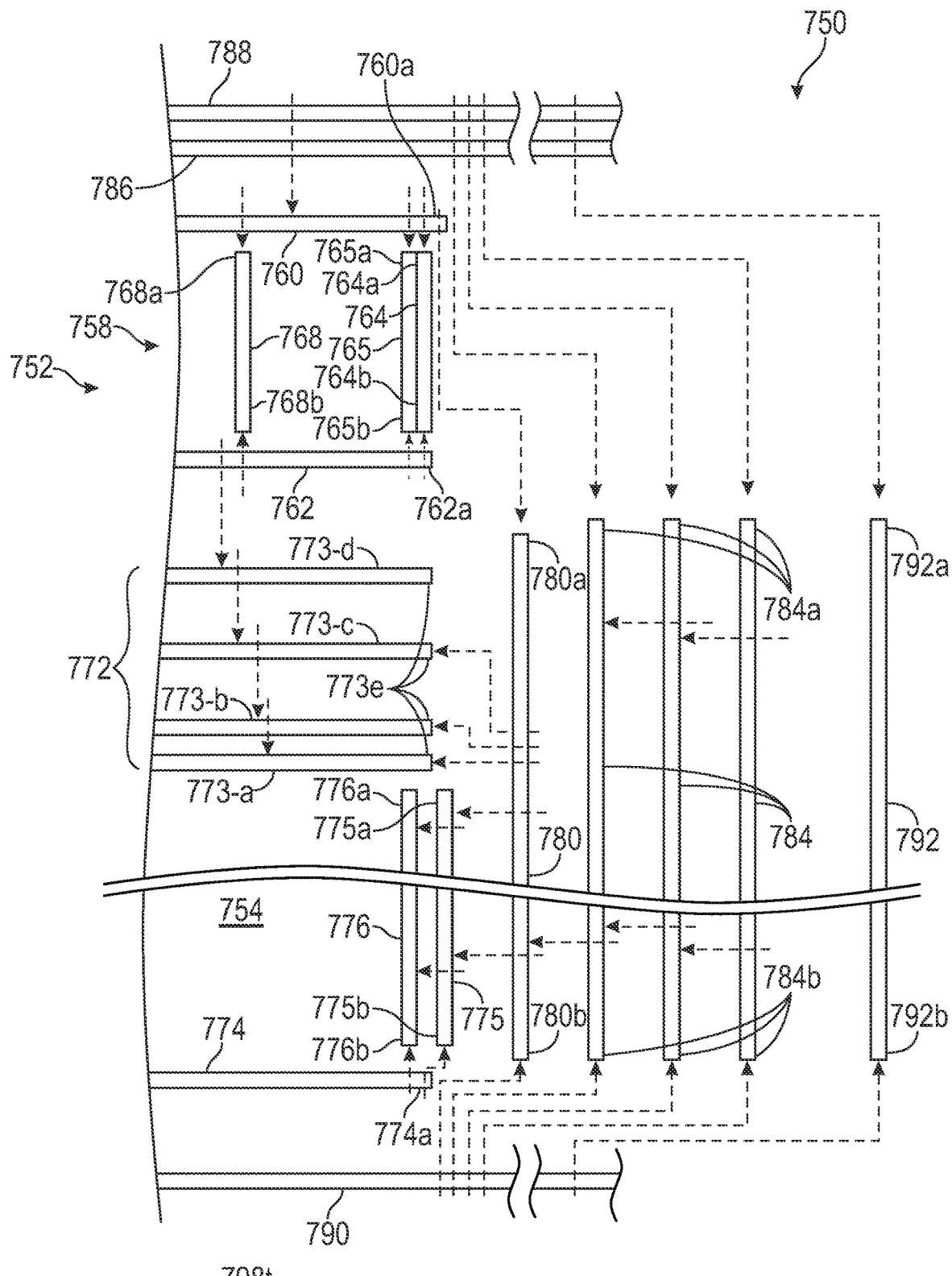
FIG. 7 is a detailed exploded front elevation view of a portion of a main element corresponding to a region of FIG. 5.

A region A corresponds to the detailed drawing provided in FIG. 7.

Figure 6:
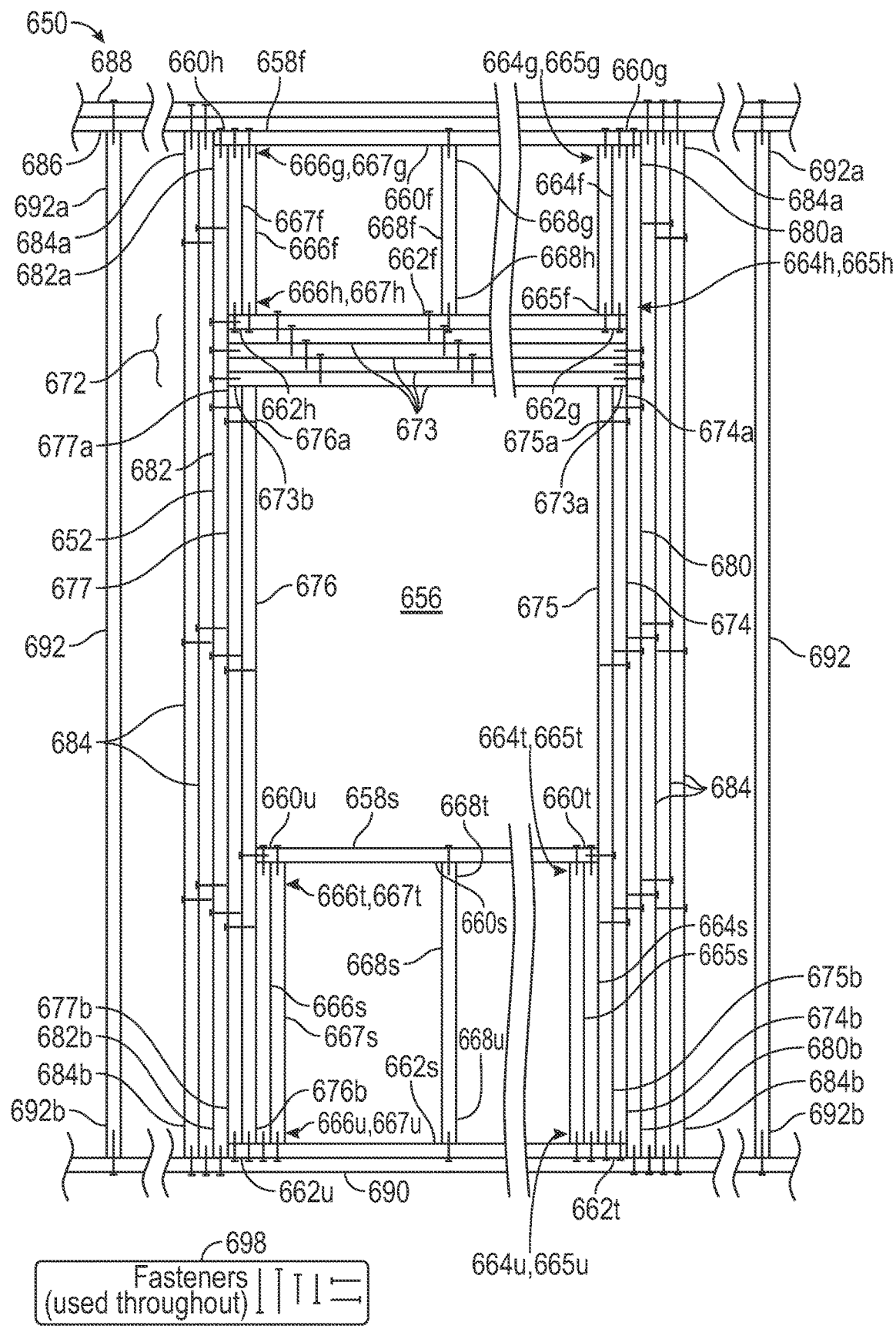
FIG. 6 is a front elevation view of a sub-element with two sub-components forming a window rough opening, according to one embodiment of the present disclosure.

FIG. 6 is a front elevation view of a portion of another building component that is a main element 650, according to another embodiment of the present disclosure, and similar in many respects to the main element 150 of FIG. 5. The main element 650 of FIG. 6 comprises a sub-element 652 to define a window rough opening 656. The main element 650 may be produced by the same methods, systems, etc., as the main element 150 of FIG. 5. In other words, the main element 650 may be a product of the wall extrusion system 1 of FIG. 1, just as other main element configurations, sub-element configurations, and sub-component configurations may be the product of the wall extrusion system 1 of FIG. 1.

The sub-element 652 may comprise one or more sub-components. For example, FIG. 6 illustrates a sub-element 652 that comprises a first sub-component 658*f* and a second sub-component 658*s*. The sub-components 658*f* and 658*s* may be substantially similar, but the lower second sub-component 658*s* may be inverted from the first sub-component 658*f* and the sub-components 658*f*, 658*s* are vertically spaced from each other, so as to define or otherwise form the window rough opening 656. The sub-element 652 also comprises a header 672, which is comprised of a plurality of members 673 such that the header 672 complies with or exceeds the relevant building code for the application. The sub-element 652 may further comprise subking studs 680, 682. The sub-element 652 further comprises a plurality of jack studs 674-677, each having a first end 674*a*-677*a* and a second end 674*b*-677*b*. The first ends 674*a*-677*a* provide structural support for the header 672 of the window rough opening 656.

The first sub-component 658*f* comprises a top plate 660*f*, a bottom plate 662*f*, a plurality of jack studs 664*f*-667*f*, and at least one cripple stud 668*f*. The one or more cripple studs 668*f* are affixed to the first sub-component 658*f* according to building code for the particular application, with a first end 668*g* of each cripple stud 668*f* coupled by fasteners 698 to the top plate 660*f*, and a second end 668*h* of each cripple stud 668*f* coupled by fasteners 698 to the bottom plate 662*f*. The jack studs 664*f*, 665*f* have first ends 664*g*, 665*g* coupled by fasteners 698 near a first end 660*g* of the top plate 660*f*, and second ends 664*h*, 665*h* coupled by fasteners 698 at a first end 662*g* of the bottom plate 662*f*. The jack studs 666*f*, 667*f* have first ends 666*g*, 667*g* coupled by fasteners 698 near a second end 660*h* of the top plate 660*f*, and second ends 666*h*, 667*h* coupled by fasteners 698 at a second end 662*h* of the bottom plate 662*f*. The top plate 660*f* of the first sub-component 658*f* may be coupled to the top plates 686, 688 of the main element 650. The bottom plate 662*f* is coupled by fasteners 698 to the header 672 of the window rough opening 656.

The second sub-component 658*s* comprises a top plate 660*s*, a bottom plate 662*s*, a plurality of jack studs 664*s*-667*s*, and at least one cripple stud 668*s*. The one or more cripple studs 668*s* are affixed to the second sub-component 658*s* according to building code for the particular application, with a first end 668*t* of each cripple stud 668*s* coupled by fasteners 698 to the top plate 660*s*, and a second end 668*u* of each cripple stud 668*s* coupled by fasteners 698 to the bottom plate 662*s*. The jack studs 664*s*, 665*s* have first ends 664*t*, 665*t* coupled by fasteners 698 near a first end 660*t* of the top plate 660*s*, and second ends 664*u*, 665*u* coupled by fasteners 698 at a first end 662*t* of the bottom plate 662*s*. The jack studs 666*s*, 667*s* have first ends 666*t*, 667*t* coupled by fasteners 698 near a second end 660*u* of the top plate 660*s*, and second ends 666*u*, 667*u* coupled by fasteners 698 at a second end 662*u* of the bottom plate 662*s*. The top plate 660*s* may function as a sill for the window rough opening 656. The bottom plate 662*s* of the second sub-component 658*s* functions as a bottom plate for the sub-element 652, and second ends 674*b*, 675*b* of the jack studs 674, 675 coupled by fasteners 698 at a first end 662*t* of the bottom plate 662*s*; and second ends 676*b*, 677*b* coupled by fasteners 698 at a second end 662*u* of the bottom plate 662*s*. King studs 684 may be affixed at the sub-element 652 by fasteners 698, with the fasteners 698 applied as appropriate to form lam-beam columns. A first end 684*a* of each king stud 684 is coupled by fasteners 698 to the top plates 686, 688, and a second end 684*b* of each king stud 684 is coupled by fasteners 698 to the bottom plate 690. In accordance with building code for the particular application, studs 692 are assembled to the main element 650, with a first end 692*a* of each stud 692 coupled by fasteners 698 to the top plates 686, 688, and with a second end 692*b* coupled by fasteners 698 to the bottom plate 690.

Having explicitly described extrusion of a main element (see main element 150 in FIG. 5, main element 650 in FIG. 6) comprising a door rough opening and a window rough opening (see the door rough opening 154 in FIG. 5, window rough opening 656 in FIG. 6), the present disclosure demonstrates capability of disclosed embodiments to build main elements having other rough opening configurations, including a plurality of configurations, such as window-over-door rough openings, window-beside-door rough openings, serial window rough openings, serial door openings, ceiling chases for MEP rough openings, floor chases for MEP rough openings, etc. Each configuration of which the present invention is capable may be accomplished via computerized control units, such as the computerized control units 107, 121 of FIGS. 1, 2, and 4. The main element extruder may comprise an additional computerized control unit. The computerized control units may be in electronic communication via a computer network, may be in electronic communication with a centralized computerized control unit, may share programmatic functionality, program code, and otherwise communicate with each other during the process of extruding a main element 150, 650. Programmatic function and/or code may be capable of storage at/retrieval from a remote location, such as the server, and of being updated or modified on a per application basis whereby particular functions may be repeatable as needed for a particular main element 150, 650. By way of example without limitation, computer code necessary to a create window rough opening of a particular dimension using a particular stock in a particular load bearing and shear condition may be repeatable by automated reuse of programmatic code. Similarly, reusable code may employ variables, as ordinarily understood in the computer sciences, to permit reuse of the code under varying conditions, such as differing stock, differing load conditions, differing shear conditions, etc.

FIG. 7 is a detailed exploded front elevation view of a portion of main element 750 corresponding to the region A of FIG. 5, and illustrates application (or application travel) 798*t* of fasteners, such as the fasteners 198 of FIG. 5. FIG. 7 illustrates an exploded (or pre-assembly) view of the main element 150 of FIG. 5 with each identified part being analogous to that part identified in FIG. 5 with a 100-series number. For example, the main element 750 of FIG. 7 is analogous to the main element 150 of FIG. 5. This pattern continues throughout the description of FIG. 7. The main element 750 of FIG. 7 comprises a sub-element 752 for a door rough opening 754 and includes a sub-component 758. Furthermore, only the parts rendered in FIG. 7 are described, however, the application of fasteners (e.g. fasteners 198 of FIG. 5) described for these parts may be similarly employed for all fasteners used throughout the main element 750.

The sub-component 758 comprises a top plate 760 and a bottom plate 762. The top plate 760 and the bottom plate 762 each have a lateral end 760*a*, 762*a* respectively. The sub-component 758 further comprises cripple studs 764, 765, 768. Each of the cripple studs 764, 765, 768 has a first end 764*a*, 765*a*, 768*a* and second end 764*b*, 765*b*, 768*b*, respectively. In FIG. 5, fasteners 198 are shown coupling together members that correspond to these, and in FIG. 7, fastener logical travel paths 798*t* are shown corresponding to each fastener. The fastener logical travel paths 798*t*, for some fasteners, are shown having bends in order to represent the logical path of travel for the given fastener and, as will be apparent to one of ordinary skill in the art, will be a straight path when the relevant members are moved into position as described herein. The cripple studs 764, 765, 768 may be coupled to the top and bottom plates 760, 762 by applying fasteners (e.g., fasteners 198 shown in FIG. 5) following fastener logical travel paths 798*t* at or near, and through the lateral end 760*a* of the top plate 760 into the first ends 764*a*, 765*a*, 768*b* of the cripple studs 764, 765, 768, and at or near, and through the lateral end 762*a* of the bottom plate 762 into the second ends 764*b*, 765*b*, 768*b* of the cripple studs 764, 765, 768.

The door rough opening 754 comprises a header 772, a bottom plate 774, and jack studs 775, 776. The header 772 may be a lam-beam comprised of multiple members 773*a* through 773*d*, inclusive. The header 772 may be assembled by placing the member 773*b* atop the member 773*a* and applying fasteners (e.g., fasteners 198 of FIG. 5) through fastener logical travel paths 798*t* through the member 773*b* into the member 773*a*. The member 773*c* may then be placed atop the member 773*b* and a fastener applied through fastener logical travel paths 798*t* through the member 773*c* into the member 773*b*. The member 773*d* may be placed atop the member 773*c* and fasteners applied through fastener logical travel paths 798*t* through the member 773*d* into the member 773*c*. Lam-beams for this purpose or any other purpose may be similarly constructed and may employ fewer or more members 773*a*-773*d* as needed for the given application. A first end 773*e* for each of the members 773*a*-773*d* of the header 772 is shown, as is a first end 774*a* of the bottom plate 774. First ends 775*a*, 776*a* and second ends 775*b*, 776*b* of the jack studs 775, 776 are also shown. In a fashion similar to the formation of the sub-element 752, the door rough opening 754 may be assembled. More particularly, the jack studs 775, 776 may be assembled in much the same way as is the header 772 by placing the jack studs 775, 776 adjacent each other and applying fasteners through fastener logical travel paths 798*t* (in this example) the jack stud 775 and into the jack stud 776. Additional jack studs may be coupled together in the same fashion, if needed for a given application. Fasteners may be applied at or near, and through the first end 774*a* of the bottom plate 774 and into the second ends 775*b*, 776*b* of the jack studs 775, 776. The first ends 775*a*, 776*a* of the jack studs 775, 776 may be placed at or near the first ends 773*e* of the members 773*a*-773*d* of the header 772. A subking stud 780 may be abutted against the jack stud 775 and fasteners may be applied through fastener logical travel paths 798*t* through the subking stud 780 and into the jack stud 775 and into the first ends 773*e* of at least some of the members 773*a*-773*d* of the header 772.

The sub-component 758 may be coupled to the door rough opening 754 by placing the bottom plate 762 of the sub-component 758 atop the header 772 and applying fasteners through fastener logical travel paths 798*t* through the bottom plate 762 and into the header 772. In the present example, the combined sub-component 758 and door rough opening 754 define the sub-element 752. During the extrusion process for the main element 750, a first top plate 786 and a second top plate 788 may be coupled together applying fasteners through fastener logical travel paths 798*t* through the first top plate 786 and into the second top plate 788. A stud 792 may be coupled to the first and second top plates 786, 788 by applying fasteners through fastener logical travel paths 798*t* through the first and second top plates 786, 788 and into a first end 792*a* of the stud 792. Similarly, fasteners may be applied through fastener logical travel paths 798*t* through a bottom plate 790 and into a second end 792*b* of the stud 792. Additional studs 792 may be similarly applied at code-designated intervals.

During extrusion of the main element 750, the sub-element 752 may be placed at a particular position between the first and second top plates 786, 788 and the bottom plate 790. A king stud 784 may be positioned against the subking stud 780 of the sub-element 752 and fasteners applied through fastener logical travel paths 798*t* through the king stud 784 and into the subking stud 780. (The king stud 784 may alternatively be applied to the sub-element 752 during generation of the sub-element 752.) Additional king studs 784 may be applied, as well, in the same fashion as described above for the header 772. Fasteners may be applied through the first and second top plates 786, 788 and into a first end 784*a* of each king stud 784, and fasteners may be applied through fastener logical travel paths 798*t* through the bottom plate 790 and into a second end 784*b* of each king stud 784.

The foregoing description is an example of a manner in which the main element 750 may be assembled, the principles of which may be applied for the entirety of the main element 750 and extended to other main element-like features of a structure to be constructed.

Figure 8A:
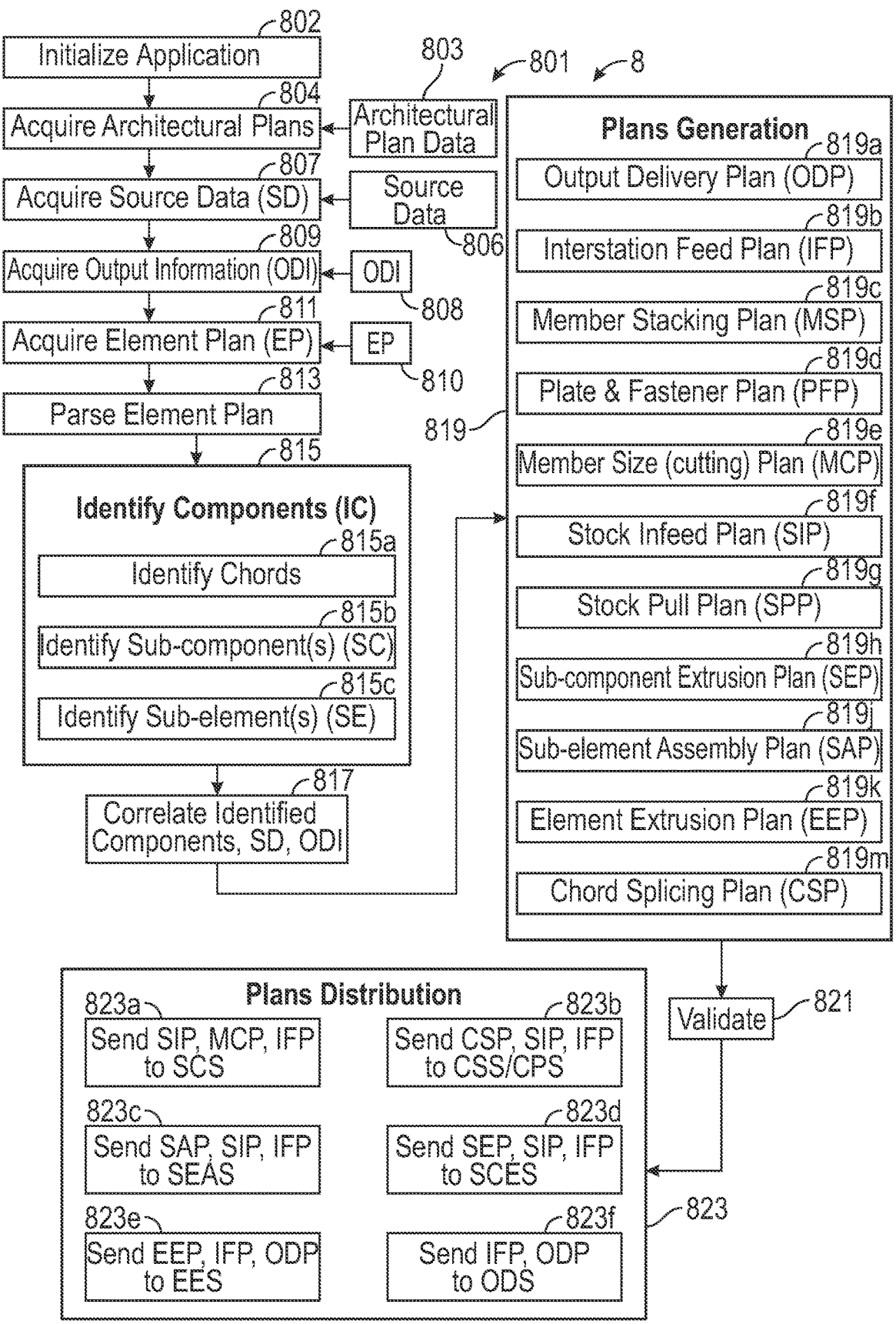
FIG. 8A is a flowchart for a method of a wall extrusion system, according to one embodiment of the present disclosure.

FIG. 8A is a flowchart illustrating a method 801 for a wall extrusion system 8 according to an embodiment of the present disclosure. The flowchart represents substantial steps in transforming a plan for construction of a structure into components for actual construction of the structure. The method 801 may be performed by means of a computer-based control system (see the computer-based control system 902 in FIG. 9) controlling components of a wall extrusion system 8. The computer-based control system may include a nontransitory memory (e.g., data storage disk, flash drive, solid state drive, disk-based Read Only Memory (ROM), etc.) capable of storing electronic instructions, collectively, an application (e.g., a software application), executable or otherwise operable by the computer-based control system. The computer-based control system may further comprise a transient memory wherein the instructions from the nontransitory memory and relevant data may be used to perform the operations herein described. The computer-based control system may further comprise a communication system to enable communication with various stations or other components of the wall extrusion system 8.

The flowchart illustrates a method 801 to transform a construction plan into operations that, when executed, manufacture elements, such as, for example, a main element, a sub-element, a sub-component, a chord, etc., for construction of the planned structure. An initial step may be to initialize 802 the application (e.g., obtain the application instructions from the nontransitory computer-readable storage in a manner known in the relevant art). Architectural plan data 803 may exist outside the computer-based control system, may be stored in any of a number of electronic formats (as by output of a design application) recognizable by the application, and can be acquired 804. Source data (SD) 806, comprising information about source material, such as material type, dimensions, qualities, etc., may be stored at the nontransitory storage medium, stored externally to the computer-based control system, or both, and can be acquired 807. Output delivery information (ODI) 808 comprises data about delivery of the result of manufacture of components by the wall extrusion system 8, such as a manner of stacking, packaging, loading to trucks/railcars, etc. (Note that ODI differs from outfeed of product at a particular station of the wall extrusion system 8, and, in some instances, may consider or comprise outfeed of product from a particular station, such as from an element extrusion station (see the element extrusion station 980 in FIG. 9).) ODI 808 can be acquired 809.

The method 801 may recursively sort through the acquired architectural plan data. In one recursion, or pass, the method 801 may acquire 811 an element plan 810. The method 801 parses 813 the element plan 810. In, or as a result of, parsing 813 the element plan 810, the method 801 may identify 815 components of the element. For example, identifying 815 components may include identifying chords 815*a*, identifying sub-components 815*b*, and identifying sub-elements 815*c*. The method 801 may then correlate 817 the identified components with SD and ODI, then may generate 819 one or more plans (e.g., input files to various stations) that may be executed to assemble and/or extrude components to build the identified main element. A plan, or input file, may be delivered, as described below, to a particular station or sub-system of the wall extrusion system 8 where the input file may function as input to the particular station or sub-system. Plans generated 819 can include an output delivery plan (ODP) 819*a* based on the ODI, an interstation feed plan (IFP) 819*b* based on particular needs for routing members and components between stations of the wall extrusion system 8, a member stacking plan (MSP) 819*c* based on ordering and orienting members during assembly and extrusion as further discussed in relation to FIGS. 8B and 8C, a plate and fastener plan (PFP) 819*d* based on the requirements for particular plates and fasteners and their placement, a member size (cutting) plan (MCP) 819*e* based on the size of source stock and needed sizes of members, a stock infeed plan (SIP) 819*f* and a stock pull plan (SPP) 819*g* based on ordering the pulling and routing of source stock, a sub-component extrusion plan (SEP) 819*h* based on identified sub-components for inclusion in the main element (or inclusion in a sub-assembly, or for stand-alone use during construction of the structure), a sub-element assembly plan (SAP) 819*j* based on identified sub-elements for inclusion in the main element (or for stand-alone use during construction of the structure), an element extrusion plan (EEP) 819*k* for extruding the main element (which may comprise inclusion of sub-elements and/or sub-components), and a chord splicing plan (CSP) 819*m* based on the particular top and bottom plates for utilization with the main element. The foregoing plans 819*a*-819*m*, collectively, may include instructions for the pulling of stock to be used for members to be incorporated into sub-components, sub-elements, chords, or main elements; cutting or otherwise sizing stock to form the members prior to inclusion in a sub-component, sub-element, chord, or the main element; transitioning or transporting members, sub-components, sub-elements, and chords between stations of the wall extrusion system 8; and handling at an output delivery station (see the output delivery station 990 in FIG. 9). Once the plans 819*a*-819*m* have been generated 819, the method 801 may validate 821 the plans 819*a*-819*m* by logically executing them to ascertain that the identified main element will be achieved through actual execution of the plans 819*a*-819*m*. The method 801 may distribute 823 the various plans 819*a*-819*m* among a plurality of stations of the wall extrusion system 8, including at least sending 823*a* the SIP, MCP, and IFP to a member sizing (cutting) station, sending 823*b* the CSP, SIP, and IFP to a chord splicing/plating station (or stations), sending 823*c* the SAP, SIP, and IFP to a sub-element assembly station, sending 823*d* the SEP, SIP, and IFP to a sub-component extrusion station, sending 823*e* the EEP, IFP, and ODP to an element extrusion station, and sending 823*f* the IFP and ODP to the output delivery station (e.g., the member sizing (cutting) station 930, chord splicing station 940, chord plating station 950, sub-component extrusion station 960, sub-element assembly station 970, the element extrusion station 980, and the output delivery station 990 in FIG. 9).

As can be appreciated, each of the stations may execute the instructions sent to it whereby a main wall may be extruded and prepared for delivery, and/or various components (e.g., members, chords, sub-components, sub-elements for independent incorporation at a construction site) may be prepared, packaged, and placed in/on a transport system (truck, railcar, etc.) for final delivery.

Figure 8B:
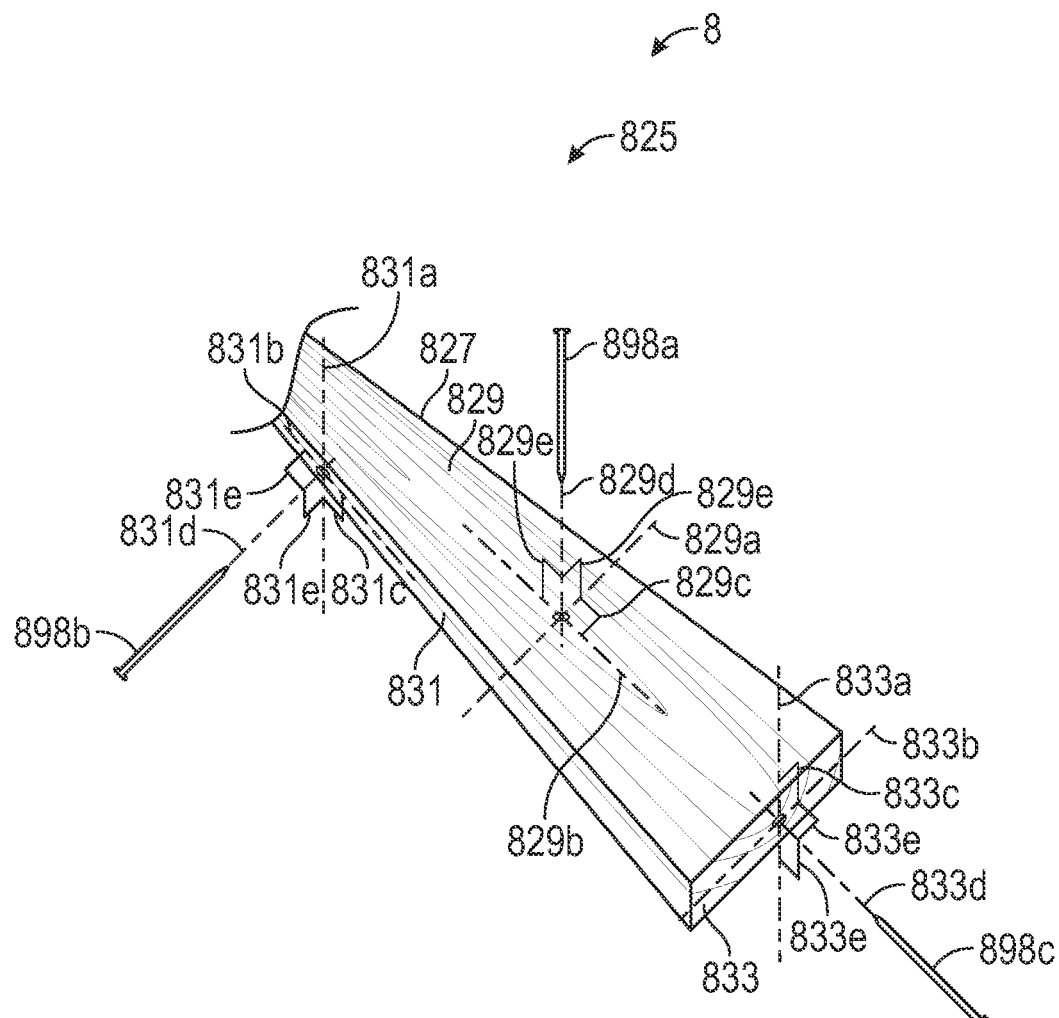
FIG. 8B is perspective view of a fastener orientation plan providing orientation detail for fasteners in a wall extrusion system, according to one embodiment of the present disclosure.

FIG. 8B is a perspective view of a fastener orientation plan 825 providing orientation detail for fasteners 898*a*, 898*b*, 898*c* in the wall extrusion system 8. A member 827 is shown in FIG. 8B and the member 827 comprises a face surface 829, an edge surface 831, and an end surface 833. A plane coordinate with the face surface 829 may be defined by a pair of lines 829*a*, 829*b* intersecting at a right angle 829*c*. The fastener 898*a* has a logical path 829*d* at right angles 829*e* to each of the lines 829*a*, 829*b* and, hence to the face surface 829. Similarly, a plane coordinate with the edge surface 831 may be defined by a pair of lines 831*a*, 831*b* intersecting at a right angle 831*c*. The fastener 898*b* has a logical path 831*d* at right angles 831*e* to each of the lines 831*a*, 831*b* and, hence, to the edge surface 831. Likewise, a plane coordinate with end surface 833 may be defined by a pair of lines 833*a*, 833*b* intersecting at a right angle 833*c*. The fastener 898*c* has a logical path 833*d* at right angles 833*e* to each of the lines 833*a*, 833*b* and, hence, to the end surface 833.

During the plan generation (e.g., plan generation 819 in FIG. 8A), the orientation of fasteners perpendicular to member surfaces, such as the member surfaces 829, 831, 833, is utilized in developing at least the MSP, the PFP, the SEP, the SAP, and the EEP (e.g., the MSP 819*c*, the PFP 819*d*, the SEP 819*h*, the SAP 819*j*, and the EEP 819*k* in FIG. 8A). The wall extrusion system 8 considers, then, a perpendicular orientation of each fastener 898*a*-898*c* relative to the first member surface to which the fastener may be applied. Perpendicular orientation of fasteners provides at least the advantages of simpler fastener appliance orientation and maximal implementation of each fastener's coupling capability (stronger than toe-nailing, for example). In other embodiments, strict perpendicular insertion may not be possible due to robot reach or configuration and in such embodiments a near-perpendicular or otherwise transverse orientation of the fasteners achieves a desired fastening and is within the scope of the present disclosure.

Figure 8C:
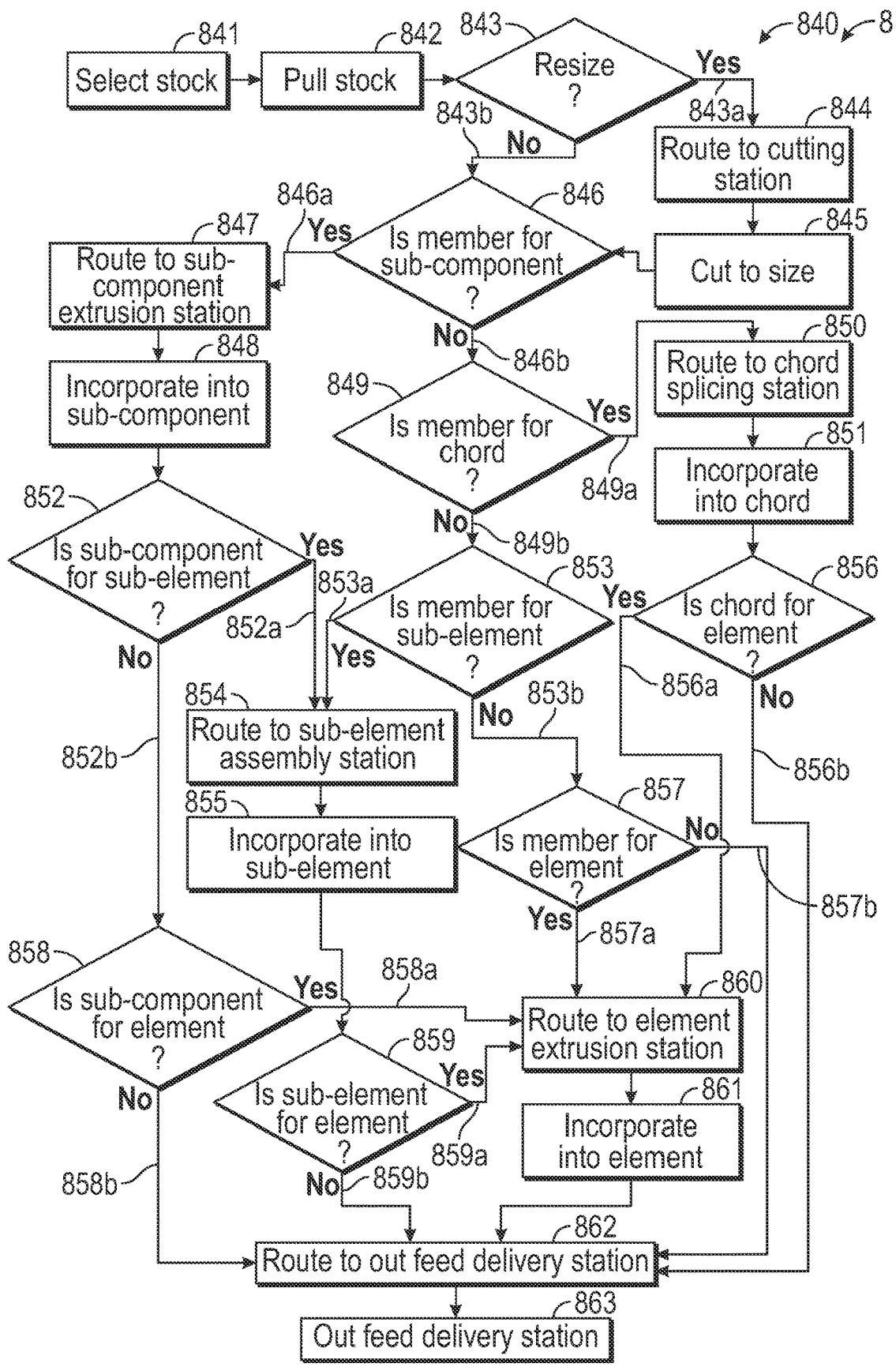
FIG. 8C is a logic diagram of a wall extrusion system, according to one embodiment of the present disclosure.

FIG. 8C is a logic diagram 840, according to an embodiment, of the wall extrusion system 8 of the present disclosure. The logic diagram 840 illustrates actions that may be included in both the method (see the method 801 of FIG. 8A) and operation of the wall extrusion system 8. References are made to a variety of stations that may be described in other parts of the disclosure. For the purposes of FIG. 8C, examples of the various stations referenced may be found in FIG. 9 (e.g., the stock sourcing station 920, the stock cutting station 930, the chord splicing station 940 and chord plating station 950, the sub-component extrusion station 960, the sub-element assembly station 970, the element extrusion station 980, and the output delivery station 990). Stock selection 841 may be based on one or more considerations, including the stock available at a stock sourcing station of the wall extrusion system 8, the requirements for each member incorporated into the final element, etc. By way of non-limiting example, a 2×6×96 common stud may be required for inclusion into a main element, and the wall extrusion system 8 may have precut pine dimensional lumber that includes 2×6×96 boards, permitting selection of such a precut board for the particular requirement. With a stock selection 841 made, the particular stock may be pulled 842, and a determination 843 may be made whether the stock needs to be resized (e.g., cut to a different length). If yes 843*a* the stock needs to be cut, the stock may be routed 844 to a stock cutting station to be cut 845 to size. The stock may hereafter be referred to as a "member" since it is of a designated size (whether as cut or as pulled) for inclusion into a sub-component, sub-element, chord, or main element. Once the stock is cut 845 to size, or if no 843*b* the stock need not be cut to size, a series of determinations are made and the routing of the member follows based upon the determinations. A determination 846 is made if the member will be used for a sub-component. If yes 846*a*, the member is routed 847 to a sub-component extrusion station for incorporation 848 into the particular sub-component. If no 846*b*, a determination 849 is made if the member will be used for a chord. If yes 849*a*, the member is routed 850 to the chord splicing station for incorporation 851 into the particular chord. (For chords, an additional determination, not shown, may be made whether to add additional plates to the chord prior to passing the chord on to the element extrusion station or the output delivery station.) If no 849*b* the member is not for use in a chord, a determination 853 is made if the member is for use in a sub-element. If yes 853*a*, the member is routed 854 to the sub-element assembly station for incorporation into the sub-element. If no 853*b*, a determination 857 is made if the member is for use in the main element. If yes 857*a*, the member is routed 860 to the element extrusion station for incorporation into the main element. If no 857*b*, the member is routed 862 to the output delivery station for preparation for final delivery 863. (A member not used in a sub-component, chord, sub-element, or main element may conceivably be prepared, as by, e.g., cutting to size, and prepared for incorporation into a structure onsite and away from the wall extrusion system 8.)

Once a plurality of members have been incorporated 848 into a sub-component, a determination 852 is made whether the sub-component is for use in a sub-element. If yes 852a, the sub-component is routed 854 to the sub-element assembly station for incorporation 855 into the particular sub-element. If no 852b, a determination 858 is made if the sub-component is for use in a main element. If yes 858a, the sub-component is routed to an element extrusion station 860. If no 858b (the sub-component may be for incorporation into a structure onsite and away from the wall extrusion system 8), the sub-component is routed to the output delivery station 862 to be prepared for final delivery 863.

Once a plurality of members may be routed 853, 853a to a sub-element assembly station for incorporation 855 (assembly) into a sub-element, a determination 859 is made whether the sub-element is to be used in a main element. If yes 859a, the sub-element is routed 860 to the element extrusion station for incorporation 861 into the main element. If no 859b (e.g., a sub-element may be assembled by the wall extrusion system 8 for incorporation into a structure onsite and away from the wall extrusion system 8), the sub-element is routed 862 to the outfeed delivery station to be prepared for final delivery 863.

Once stock is incorporated 851 into a chord, a determination 856 is made if the chord is to be used with a main element. If yes 856a, the chord is routed 860 to the element extrusion station to be incorporated 861 into the main element. If no 856b (e.g., a chord may be prepared for incorporation into a structure onsite and away from the wall extrusion system 8), the chord is routed 862 to the output delivery station to be prepared for final delivery 863.

Once a main element has been extruded, the main element is routed 862 to the output delivery station to be prepared for final delivery 863. In other embodiments, the main element may be routed to the output delivery station to be used onsite for constructing a structure. In still other embodiments, the main element may be routed to a sheathing area.

The exact order of the actions 841-863 may vary, and the present disclosure anticipates variations in the order of the actions. For example, without limitation, determination whether a member is to be used for a chord may precede determination of using a member for a sub-component. Selection of fasteners and plates, while not explicitly detailed herein, may be based on requirements enumerated in a particular architectural plan and the availability of code-compliant fasteners and plates to the wall extrusion system 8.

Figure 9:
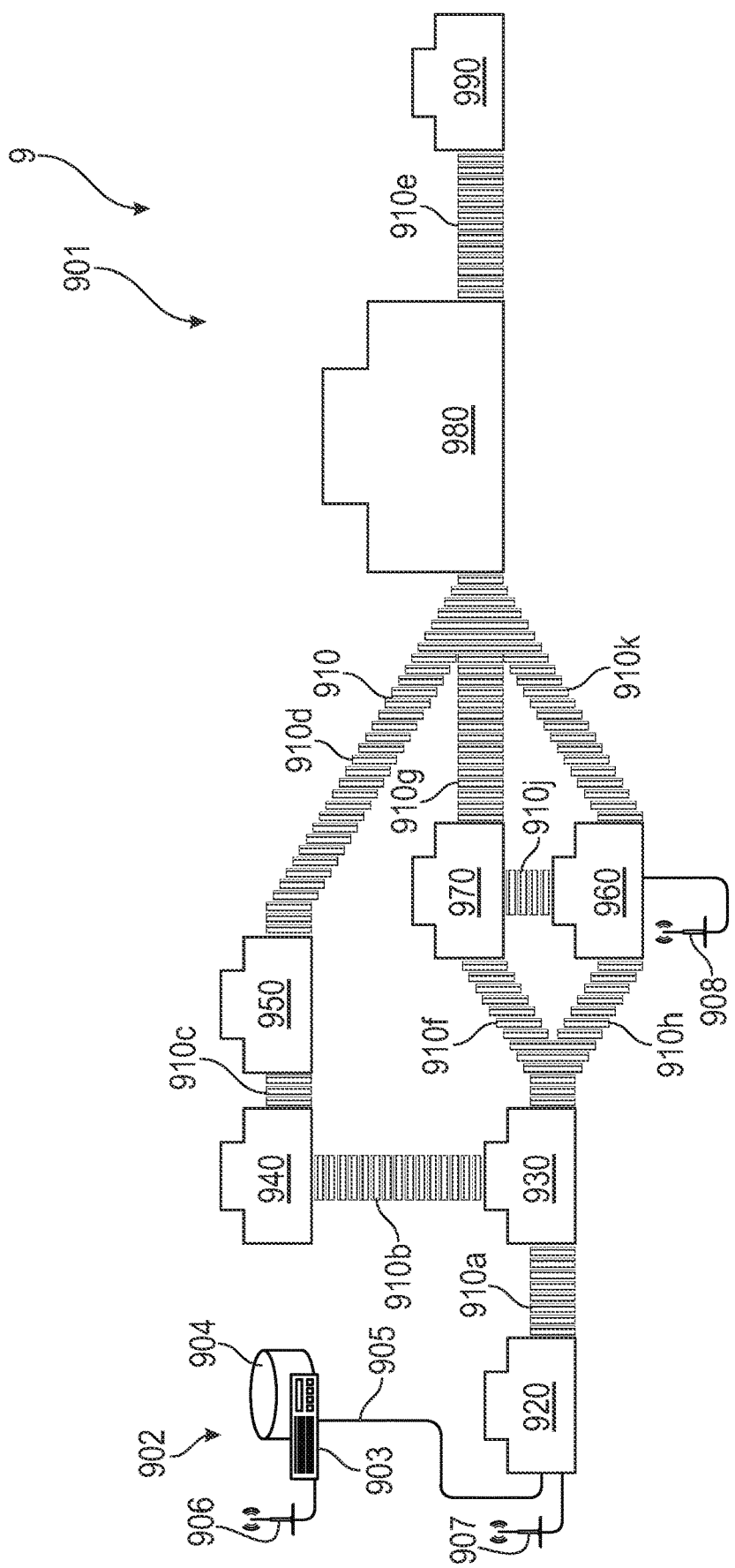
FIG. 9 is an example of a layout of a wall extrusion system, according to an embodiment of the present disclosure.

FIG. 9 is an example floor plan 901 (or layout or arrangement of components) for a wall extrusion system 9, according to an embodiment of the present disclosure. The wall extrusion system 9 is an example of a building element assembly system, according to one embodiment of the present disclosure. The wall extrusion system 9 includes a computer-based control system 902, which may comprise at least a server 903 or similar computing device and a data storage device 904. The server 903 may be a purpose-built computer configured for the wall extrusion system 9. The server 903 may comprise a nontransitory memory (e.g., fixed disk storage device, flash drive, or other memory system known in the art), a transient memory (e.g., system memory), communication sub-systems, a monitor, a keyboard or other input device, etc. The data storage device 904 comprises at least a nontransitory memory capable of storing instructions as described elsewhere herein and accessible to the server 903. In one embodiment, the data storage device 904 may be incorporated into the server 903. In one embodiment, the data storage device 904 and server 903 may be remotely disposed to each other. The server 903 may function, for example, as a supervisory computer in a supervisory control and data acquisition (SCADA) system, like or similar to what may be typical in the art.

The server 903 has, or has access to, a communication system whereby the server 903 is able to communicate with various stations of the wall extrusion system 9. The various stations described herein may be equipped with computing devices, such as peripheral SCADA devices, in order to communicate with, receive instructions from, and send data to the server 903. By way of example, a wire-base communication system 905 is indicated in FIG. 9 as coupled between the server 903 and a stock sourcing station (SSS) 920. The SSS 920 may comprise a computing device, such as a SCADA device, whereby the SSS 920 receives instructions from the server 903, interprets and executes the instructions whereby the SSS 920 is enabled to select stock, pull stock, and place stock into a transport sub-system (TSS) 910 of the wall extrusion system 9. Furthermore, the server 903 may be in similar wire-based communication with some or all other stations of the wall extrusion system 9 to enable each station to receive instruction, signal, or other communication to perform the functions of the station with regard to the particular element (or component) to be extruded.

By way of example, a wireless communication device 906 may be coupled at the server 903, and additional wireless communication devices may be coupled at one or more stations of the wall extrusion system 9 (wireless devices 907, 908 are shown coupled to the SSS 920 and the sub-component extrusion station (SCES) 960, respectively) to enable similar communication and operation. Furthermore, the wall extrusion system 9 may comprise a mixed communication platform or environment having both wired and wireless communication.

The TSS 910 comprises segments, with segments 910a-910k shown for reference. The SSS 920 may select and pull stock, and place the stock into a segment 910a to transport the stock from the SSS 920 to a stock sizing (cutting) station SCS 930. In some embodiments, a piece of stock that need not be resized may be routed to the SCS 930, and the SCS 930 may have an instruction to pass the particular stock through the SCS 930 without resizing it. The SCS 930 may further have an instruction directing that the particular piece of stock (hereafter, member) be directed to either a chord splicing station (CSS) 940 via a transport segment 910b, or to the SCES 960 via a transport segment 910h, or to a sub-element assembly station (SEAS) 970 via a transport segment 910f.

In the first instance, the CSS 940 may have instructions from the server 903 to splice the member to a preceding member (and/or a following member) to define a chord for a given element, and to pass the chord to a chord plating station (CPS) 950 via a transport segment 910c. A chord may be forwarded from the CSS 940 to the CPS 950 and the CPS 950 may apply plates to pre-plate the chord per instructions received from the server 903. Alternatively, the CPS 950 may simply allow the chord to pass through without applying plates. From the CPS 950, the chord may be transported via the transport segment 910d to the element extrusion station (EES) 980. The EES 980 may incorporate the chord into the main element based on instruction from the server 903, or may permit the chord to pass through the EES 980 without incorporation into an element. In other embodiments, the CSS 940 and the CPS 950 may comprise the same system (i.e., a single piece of equipment that performs splicing and plating of chords).

Members transported to the SCES 960 may be incorporated into a sub-component, per instructions from the server 903. A completed sub-component may, based on instruction from the server 903, be transferred via a transport segment 910j to the SEAS 970 for incorporation into a sub-element. Alternatively, based on instruction from the server 903, a sub-component (or an unincorporated member) may be sent via a transport segment 910k to the EES 980. In some embodiments, based on instruction from the server 903, a sub-component may be transported to another station for further assembly and/or for incorporation to form a portion of a more complex sub-component. Similarly, an assembled sub-element may be sent via a transport segment 910g to the EES 980. In other embodiments, based on instruction from the server 903, a sub-element may be transported to another station for further assembly and/or for incorporation to form a portion of a more complex sub-element.

The EES 980 may receive instructions from the server 903 directing the EES 980 how to handle each member, chord, sub-component, and sub-element arriving at the EES 980. Based on the instructions received from the server 903, the EES 980 may incorporate each member, chord, sub-component, or sub-element, or may allow any one or plurality of them to pass through the EES 980 without incorporation into a main element. In the example shown, a member, chord, sub-component, sub-element, or main element leaves the EES 980 and is sent via transport segment 910e to the output delivery station (ODS) 990.

The ODS 990 may be configured to automatically, and based on instructions from the server 903, package (e.g., strap together, label, etc.) any unincorporated member(s), chord(s), sub-component(s), or sub-element(s), as well as each main element arriving at the ODS 990. The ODS 990 may be further configured to stack, store, and otherwise handle or manipulate members, chords, sub-components, sub-elements, and main elements in preparation for placement in/on a delivery platform, such as a flatbed truck, an enclosed trailer, or a railcar. In some embodiments, an ODS 990 may be absent, and an output sub-component, a sub-element, or a main element is simply utilized (e.g., onsite construction), transported/delivered, input to a further assembly process (e.g., an input to a further, more complex assembly), or otherwise output or exited from the EES 980 absent an ODS 990.

The floor plan 901 is but one example of a wall extrusion system 9 according to the present disclosure. In another embodiment, there may be fewer stations (e.g., the CPS 950 may be omitted). In an embodiment, a second of a given station may be employed (e.g., two CSS 940 may operate, conceivably in parallel, or multiple ODS 990 may be present, and each may be configured for a particular output regime). Furthermore, although the entirety of the TSS 910 is shown as having but a single form, various transport segments 910a-910k may take different forms. For example, without limitation, the transport segment 910a may be a conveyor belt, the transport segments 910d, 910g, and 910k may be defined by a smart conveyor system, or the transport segment 910j may be defined by a simple or multi-axis robotic arm, etc. Finally, the relative disposition of stations may vary from one embodiment to another.

EXAMPLES

The following are some examples of systems and methods for assembling building elements, including sub-elements.

In order to avoid complexity in providing the disclosure, not all of the examples listed below are separately and explicitly disclosed as having been contemplated herein as combinable with all of the other examples listed below and other embodiments disclosed hereinabove. Unless one of ordinary skill in the art would understand that these examples listed below (and the above disclosed embodiments) are not compatible, it is contemplated within the scope of the present disclosure that such examples and embodiments are combinable.

Example 1. A system for assembling a sub-element to be included in a building component comprising: a sub-component extrusion station for extruding a sub-component, the sub-component extrusion station comprising: a sub-component assembly surface; and a robotic arm configured to position members of a sub-component on the sub-component assembly surface for extrusion of the sub-component, wherein the sub-component comprises: a first member and a second member that are parallel; and a plurality of cripple studs, wherein a first end of each cripple stud of the plurality of cripple studs is coupled to the first member and a second end of each cripple stud of the plurality of cripple studs is coupled to the second member; and a sub-element assembly station comprising: a sub-element assembly surface on which the sub-element assembly station assembles a sub-element of a building component; and a robotic arm configured to incorporate the sub-component into the sub-element.

Example 2. The system of Example 1, further comprising a robot to position the sub-element on a building component assembly surface in relation to components of the building component for incorporating the sub-element into the building component.

Example 3. The system of Example 1, wherein the sub-component extrusion station comprises an extrusion plane that is orthogonal to the sub-component assembly surface and disposed at a lateral end of the sub-component assembly surface.

Example 4. The system of Example 1, wherein the cripple studs are perpendicular to the first and second members.

Example 5. The system of Example 1, wherein the sub-component comprises three cripple studs.

Example 6. The system of Example 1, wherein the plurality of cripple studs are equally spaced laterally apart from each other.

Example 7. The system of Example 1, wherein the plurality of cripple studs are not equally spaced laterally apart from each other.

Example 8. The system of Example 1, wherein the sub-component is incorporated at an upper portion of the sub-element to form a door rough opening in the sub-element.

Example 9. The system of Example 1, wherein a first sub-component is incorporated at an upper portion of the sub-element and a second sub-component is incorporated at a lower portion of the sub-element to form a window rough opening in the sub-element.

Example 10. The system of Example 1, wherein a plurality of sub-components are positioned to form a plurality of rough openings in the sub-element.

Example 11. The system of Example 1, wherein the sub-component incorporated into the sub-element defines a rough opening.

Example 12. The system of Example 1, wherein one or more sub-components incorporated into the sub-element defines a dedicated opening or protected space.

Example 13. The system of Example 1, wherein the building component is a wall.

Example 14. The system of Example 1, the sub-component assembly table comprising a first rail and a second rail, wherein the first rail supports the first member and the second rail supports the second member, wherein the first rail and the second rail are parallel and the first rail and the second rail are adjustable to adjust the distance between the first rail and the second rail to define the height of the sub-component.

Example 15. The system of Example 1, wherein a length of a first member is longer than a length of the second member.

Example 16. The system of Example 15, wherein a first cripple stud is disposed near a lateral edge of the first member and a lateral edge the second member, a third cripple stud is disposed near an opposite lateral edge of the first member and at an opposite lateral edge the second member, and a second cripple stud is disposed between the first cripple stud and the second cripple stud.

Example 17. A method of extruding a sub-component to be incorporated into a sub-element comprising: loading, by a robot, a first member onto a sub-component assembly surface; loading a second member onto the sub-component assembly surface parallel to and spaced from the first member; loading, by a robot, a first cripple stud with a first end of the first cripple stud abutting the first member and a second end of the first cripple stud abutting the second member, wherein the first cripple stud is perpendicular to the first member and the second member; fastening, by a robot, the first cripple stud to the first member; fastening, by a robot, the first cripple stud to the second member; loading a second cripple stud with a first end of the second cripple stud abutting the first member and a second end of the second cripple stud abutting the second member, wherein the second cripple stud is perpendicular to the first member and the second member and laterally offset from the first cripple stud; fastening, by a robot, the second cripple stud to the first member; and fastening, by a robot, the second cripple stud to the second member.

Example 18. The method of Example 17, further comprising advancing, by a robot, the sub-component along the sub-component assembly surface between fastening cripple members to the first member and the second member.

Example 19. The method of Example 17, wherein three or more cripple studs are fastened to the first member and fastened to the second member.

Example 20. The method of Example 17, wherein the two or more cripple studs are fastened with a first nail to the first member and fastened with a second nail to the second member.

Example 21. The method of Example 17, wherein a length of the first member is longer than a length of the second member.

Example 22. A system for assembling a building component comprising: a sub-component extrusion station for extruding a sub-component, the sub-component extrusion station comprising: a sub-component assembly surface; and a positioning robotic arm configured to position members of a sub-component on the sub-component assembly surface for extrusion of the sub-component, wherein the sub-component comprises: a first member and a second member that are parallel; and a plurality of cripple studs, wherein a first end of each cripple stud of the plurality of cripple studs is coupled to the first member and a second end of each cripple stud of the plurality of cripple studs is coupled to the second member; and a sub-element assembly station comprising: a sub-element assembly surface; an incorporating robotic arm configured to incorporate the sub-component into the sub-element; and a building element assembly station for extruding the building component, the building element assembly station comprising: a building component assembly surface; and a robot configured to position the sub-element on the building component assembly surface to integrate with the building component.

Example 23. The system of Example 22, wherein the sub-component extrusion station comprises an extrusion plane that is orthogonal to the sub-component assembly surface and disposed at a lateral end of the sub-component assembly surface.

Example 24. The system of Example 22, wherein the cripple studs are perpendicular to the first and second members.

Example 25. The system of Example 22, wherein the sub-component comprises three cripple studs.

Example 26. The system of Example 22, wherein the plurality of cripple studs are equally spaced laterally apart from each other.

Example 27. The system of Example 22, wherein the plurality of cripple studs are not equally spaced laterally apart from each other.

Example 28. The system of Example 22, wherein the sub-component is incorporated at an upper portion of the sub-element to form a door rough opening in the sub-element.

Example 29. The system of Example 22, wherein a first sub-component is incorporated at an upper portion of the sub-element and a second sub-component is incorporated at a lower portion of the sub-element to form a window rough opening in the sub-element.

Example 30. The system of Example 22, wherein a plurality of sub-components are positioned to form a plurality of rough openings in the sub-element.

Example 31. The system of Example 22, wherein the sub-component incorporated into the sub-element defines a rough opening.

Example 32. The system of Example 22, wherein one or more sub-components incorporated into the sub-element defines a dedicated opening or protected space.

Example 33. The system of Example 22, wherein the building component is a wall.

Example 34. The system of Example 22, the sub-component assembly table comprising a first rail and a second rail, wherein the first rail supports the first member and the second rail supports the second member, wherein the first rail and the second rail are parallel and the first rail and the second rail are adjustable to adjust the distance between the first rail and the second rail to define the height of the sub-component.

Example 35. The system of Example 22, wherein a length of a first member is longer than a length of the second member.

Example 36. The system of Example 35, wherein a first cripple stud is disposed near a lateral edge of the first member and a lateral edge the second member, a third cripple stud is disposed near an opposite lateral edge of the first member and at an opposite lateral edge the second member, and a second cripple stud is disposed between the first cripple stud and the second cripple stud.

Example 37. A system for assembling a building component comprising: a sub-component extrusion station for extruding a sub-component (or sill), the sub-component extrusion station comprising: a sub-component assembly surface; and a robotic arm configured to position members of a sub-component on the sub-component assembly surface for extrusion of the sub-component, wherein the sub-component comprises: a first member and a second member that are essentially parallel; and a plurality of cripple studs, wherein a first end of each cripple stud of the plurality of cripple studs is coupled to the first member and second end of each cripple stud of the plurality of cripple studs is coupled to the second member; and a sub-element assembly station comprising: a sub-element assembly surface; a robotic arm configured to access the sub-element assembly surface and to incorporate the sub-component into the sub-element; and a building component assembly station for extruding the building component, the building component assembly station comprising: a building component assembly surface; a robot configured to position the sub-element on the building component assembly surface relative to components of the building component.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid state memory devices, or other types of medium/machine-readable medium suitable for storing electronic instructions.

An engine, module, or component may include any type of computer instruction or computer executable code located with a memory device and/or computer-readable storage medium, as is well known in the art.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

It will be obvious to those having skill in the art that many changes may be made to the details of the above-described embodiments without departing from the underlying principles of the invention. The scope of the present inventions should, therefore, be determined only by the following claims.

The invention claimed is:
1. A system comprising:
a sub-component extrusion station for assembling and extruding a sub-component, the sub-component extrusion station comprising:
 a sub-component assembly surface; and
 a first robotic arm configured to position members of the sub-component on the sub-component assembly surface, wherein the sub-component comprises:
  a first member and a second member that are parallel; and
  a plurality of cripple studs, wherein a first end of each cripple stud of the plurality of cripple studs is coupled to the first member and a second end of each cripple stud of the plurality of cripple studs is coupled to the second member to assemble the sub-component, wherein the sub-component extrusion station is configured to extrude the sub-component after assembly to an outfeed table;
a sub-element assembly station comprising:
 a sub-element assembly surface configured to receive the sub-component from the outfeed table; and
 a second robotic arm configured to assemble a sub-element using the sub-component; and a main element extruder comprising:
 a main element extrusion surface to receive the sub-element from the sub-element assembly station; and
 a third robotic arm configured to assemble a main element using the sub-element, wherein the main element is a frame structure of a building component.
2. The system of claim 1, further comprising a robot to position the sub-element on the main element extrusion surface from the sub-element assembly station to assemble the main element.
3. The system of claim 1, wherein the sub-component extrusion station comprises an extrusion plane that is orthogonal to the sub-component assembly surface and disposed at a lateral end of the sub-component assembly surface.
4. The system of claim 1, wherein the cripple studs are perpendicular to the first and second members.
5. The system of claim 1, wherein the sub-component comprises three cripple studs.
6. The system of claim 1, wherein the plurality of cripple studs are equally spaced laterally apart from each other.
7. The system of claim 1, wherein the plurality of cripple studs are not equally spaced laterally apart from each other.
8. The system of claim 1, wherein the sub-component is incorporated at an upper portion of the sub-element to form a door rough opening in the sub-element.
9. The system of claim 1, wherein a first sub-component is incorporated at an upper portion of the sub-element and a second sub-component is incorporated at a lower portion of the sub-element to form a window rough opening in the sub-element.

10. The system of claim 1, wherein a plurality of sub-components are positioned to form a plurality of rough openings in the sub-element.

11. The system of claim 1, wherein the sub-component incorporated into the sub-element defines a rough opening.

12. The system of claim 1, wherein one or more sub-components incorporated into the sub-element defines a dedicated opening or protected space.

13. The system of claim 1, wherein the building component is a wall.

14. The system of claim 1, wherein the sub-component assembly surface comprises a first rail and a second rail, wherein the first rail supports the first member and the second rail supports the second member, wherein the first rail and the second rail are parallel and the first rail and the second rail are adjustable to adjust a distance between the first rail and the second rail to define a height of the sub-component.

15. The system of claim 1, wherein a length of the first member is longer than a length of the second member.

16. The system of claim 15, wherein a first cripple stud is disposed near a lateral edge of the first member and a lateral edge of the second member, a third cripple stud is disposed near an opposite lateral edge of the first member and at an opposite lateral edge the second member, and a second cripple stud is disposed between the first cripple stud and the second cripple stud.

17. A system comprising:
a sub-component extrusion station for assembling and extruding a sub-component, the sub-component comprising a plurality of members, the sub-component extrusion station comprising:
a sub-component assembly surface; and
a first robotic arm configured to position members of the sub-component on the sub-component assembly surface, wherein the sub-component comprises:
a first member and a second member that are parallel; and
a plurality of cripple studs, wherein a first end of each cripple stud of the plurality of cripple studs is coupled to the first member and a second end of each cripple stud of the plurality of cripple studs is coupled to the second member to assemble the sub-component, wherein the sub-component extrusion station is configured to extrude the sub-component after assembly to an outfeed table;
a sub-element assembly station comprising:
a sub-element assembly surface configured to receive the sub-component from the outfeed table;
a second robotic arm configured to incorporate the sub-component into a sub-element;
a main element assembly station for extruding a main element, wherein the main element is a framing structure of a building component, the main element assembly station comprising:
a main element assembly surface configured to receive the sub-element from the sub-element assembly station; and
a third robot configured to position the sub-element on the main element assembly surface to integrate with the main element and;
a controller having one or more processors, coupled to memory, wherein the one or more processors execute computer-readable instructions stored in the memory to:
dispose and fasten, by the sub-component extrusion station, the members of the sub-component;
extrude, by the sub-component extrusion station, the sub-component;
assemble, by the sub-element assembly station, the sub-element using the sub-component;
extrude, by the sub-element assembly station, the sub-element; and
assemble, by the main element assembly station, the main element.

18. The system of claim 17, further comprising:
the controller configured to analyze a property of at least one of the sub-component or the sub-element based on at least one of a source data or output delivery information to generate a plan for assembling the main element,
wherein the source data comprises information about a source material from which the sub-component or the sub-element is formed and the output delivery information comprises data about delivery of an output of the system.

19. The system of claim 17, wherein the sub-component extrusion station comprises an extrusion plane that is orthogonal to the sub-component assembly surface and disposed at a lateral end of the sub-component assembly surface.

20. The system of claim 17, wherein the sub-component assembly surface comprises a first rail and a second rail, wherein the first rail supports the first member and the second rail supports the second member, wherein the first rail and the second rail are parallel and the first rail and the second rail are adjustable to adjust a distance between the first rail and the second rail to define a height of the sub-component.

* * * * *